United States Patent [19]

Athénes et al.

[11] Patent Number: 4,491,837
[45] Date of Patent: Jan. 1, 1985

[54] LOGIC SELECTION MODULE

[75] Inventors: Claude Athénes; Francois Tarbouriech; Gérard Poux, all of Colombes, France

[73] Assignee: Thomson-CSF Telephone, Colombes, France

[21] Appl. No.: 361,812

[22] Filed: Mar. 23, 1982

[30] Foreign Application Priority Data

Mar. 31, 1981 [FR] France ............................. 81 06429

[51] Int. Cl.³ ............................................. H04Q 11/04
[52] U.S. Cl. ........................... 340/825.02; 179/18 EE; 370/59
[58] Field of Search ...................... 340/825.02, 825.03, 340/825.04, 825.5; 375/7; 370/64, 61, 59, 32, 26; 179/18 EE, 276

[56] References Cited

U.S. PATENT DOCUMENTS

| | | | |
|---|---|---|---|
| 3,786,197 | 1/1974 | Jacobs et al. | 179/18 AT |
| 3,806,886 | 4/1974 | McClellan et al. | 370/59 |
| 3,900,833 | 8/1975 | Rogers | 340/825.03 |
| 4,160,130 | 7/1979 | Marchetti et al. | 179/18 EE |
| 4,261,052 | 4/1981 | Persson et al. | 370/59 |

OTHER PUBLICATIONS

International Switching Symposium, May 7-11, 1979, Committee of CIC Paris, S. M. Schreiner et al.: "Use of Microprocessors in Large Digital Switching Systems", pp. 737-744.

Telecommunications and Radio Engineering, vol. 29-30, No. 2, 1975, Washington, M. K. Goncharok et al.: "Parameters of the Connecting Networks Between a Special Purpose Control Computer (SPCC) and Telephone Equipment", pp. 28-33.

Review of the Electrical Communication Laboratories, vol. 27, No. 9/10, 1979, Y. Kaneko et al.: "Signaling Equipment for Digital Switching System", pp. 740-757.

International Switching Symposium, May 7-11, 1979, Committee of CIC Paris, J. P. Lager, et al., "Fault Detection and Processing in the MT Time Division System", pp. 193-200.

Primary Examiner—Donald J. Yusko
Attorney, Agent, or Firm—Roland Plottel

[57] ABSTRACT

A logic selection module for forming the interface between the two central units and eight selection circuits of an electronic time automatic telephone switchboard and which comprises means for selecting the calling central unit, means for connecting the thus selected central unit, means for decoding the address of one of the eight selection circuits to which the module is connected in the signal received from the thus selected central unit and means for transmitting the marking signals received from the central unit to the said circuit, whose address has been decoded.

8 Claims, 23 Drawing Figures

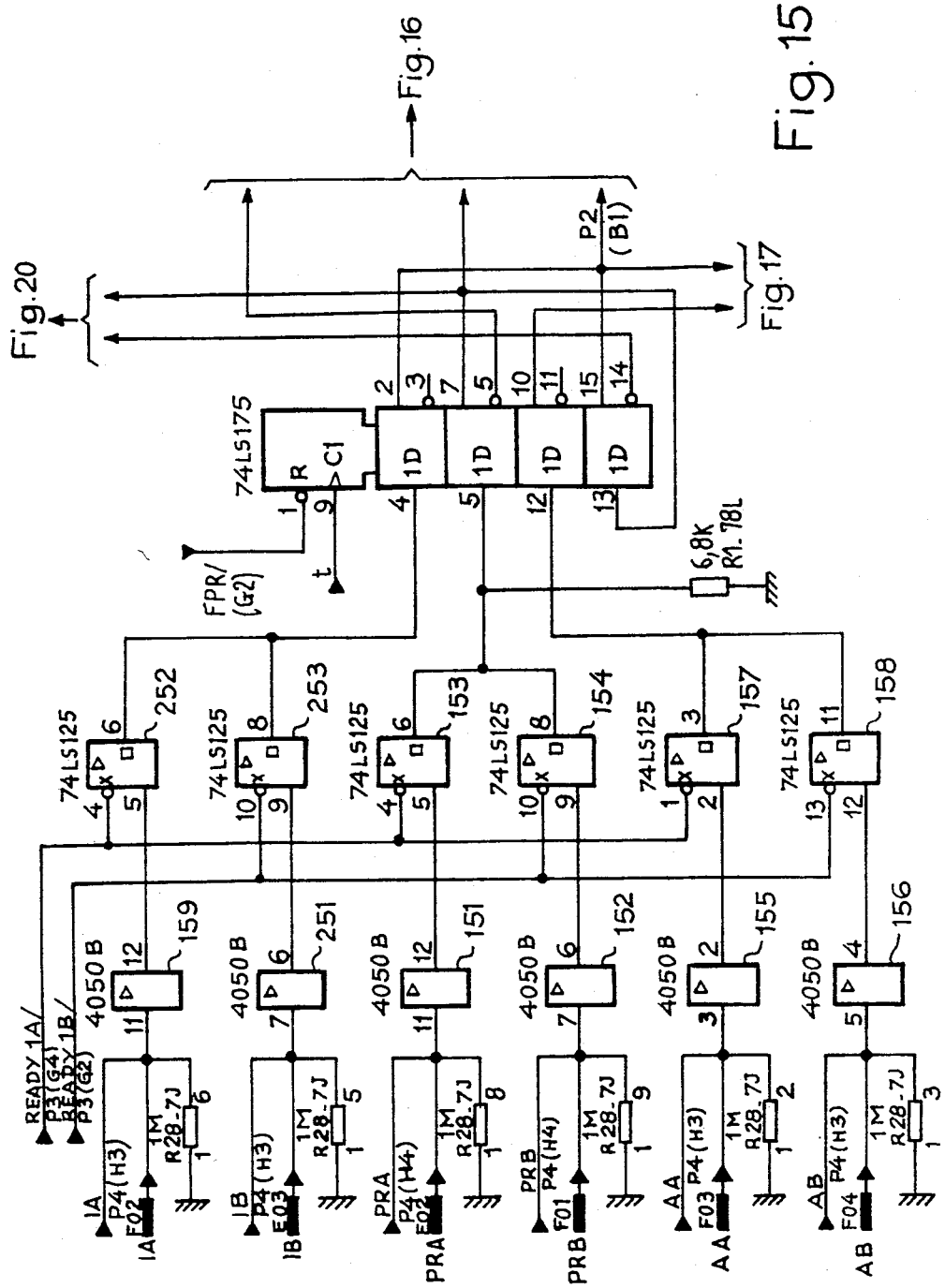

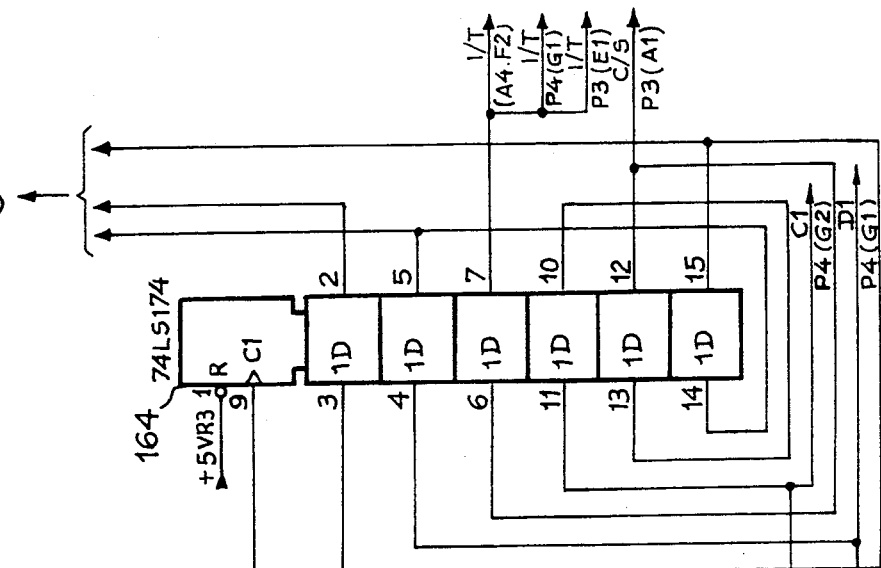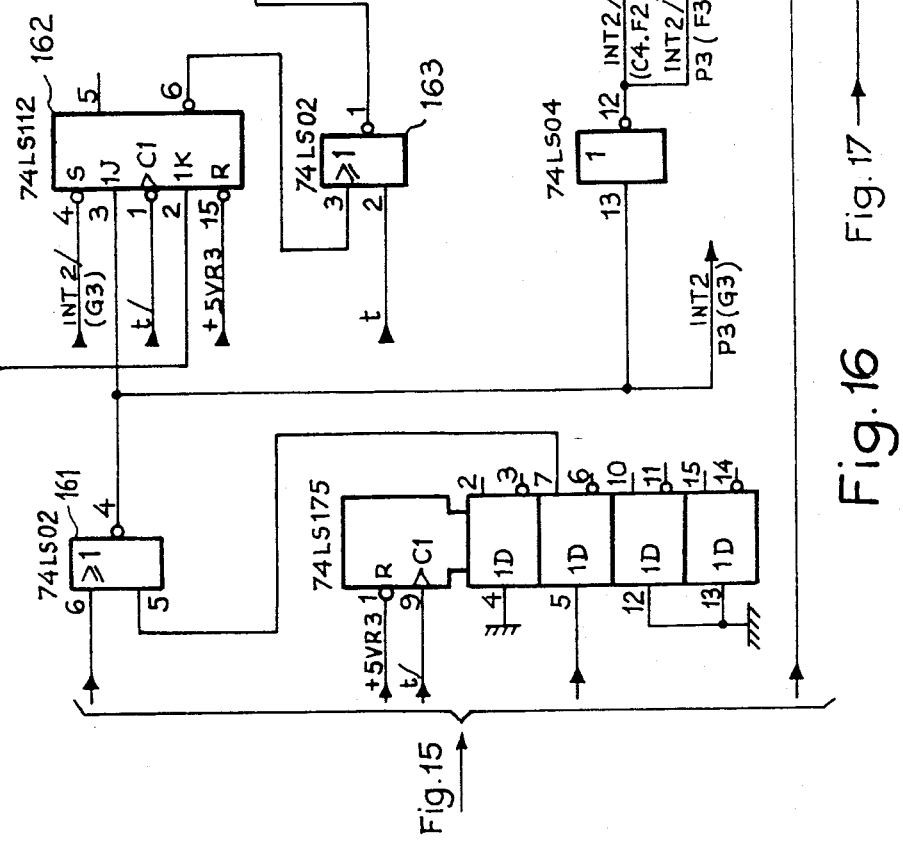

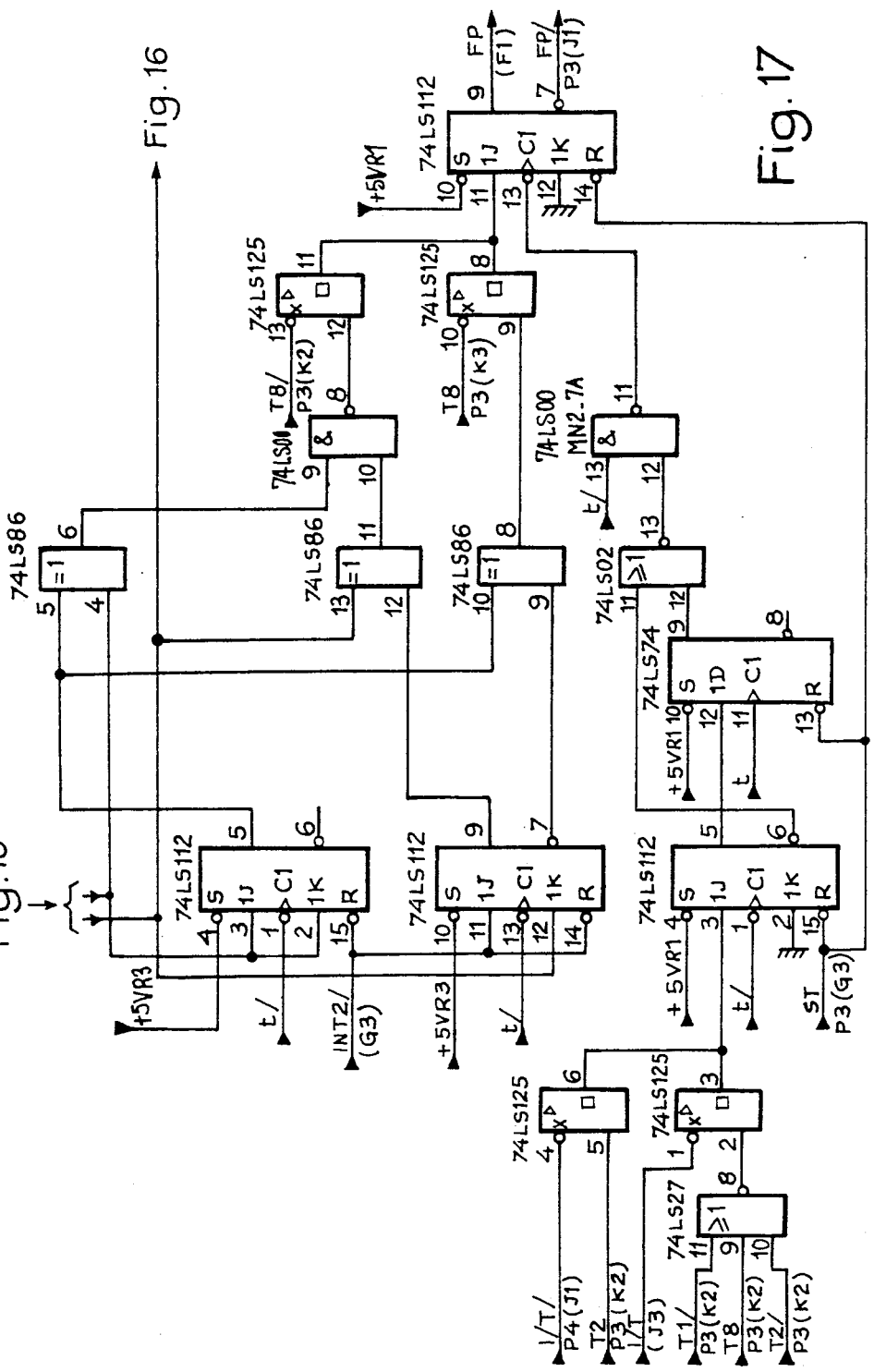

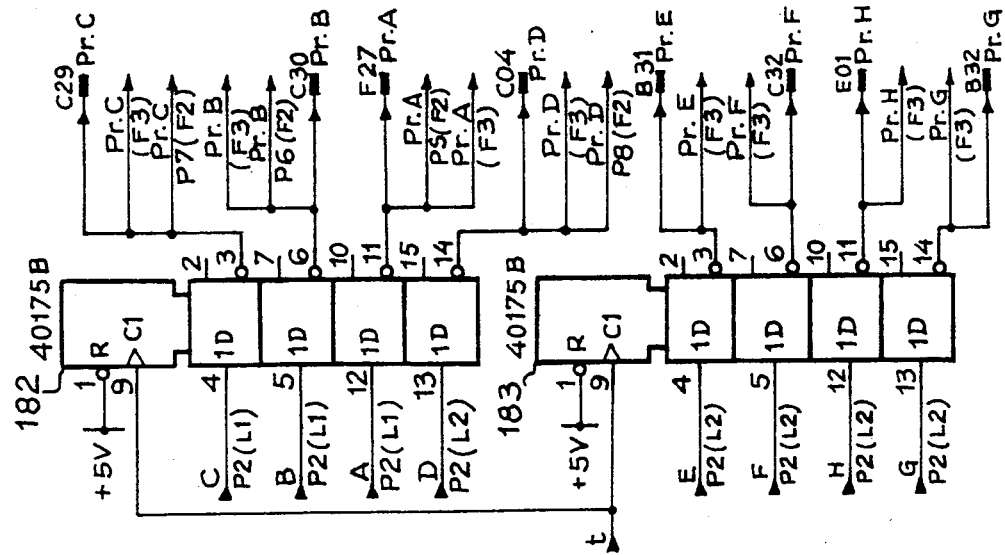
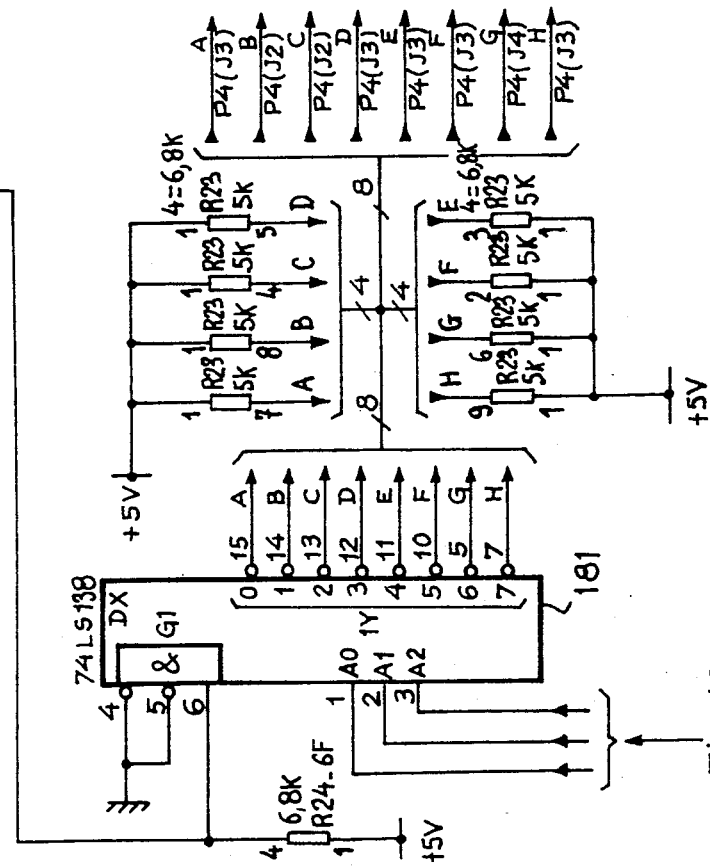
Fig. 18

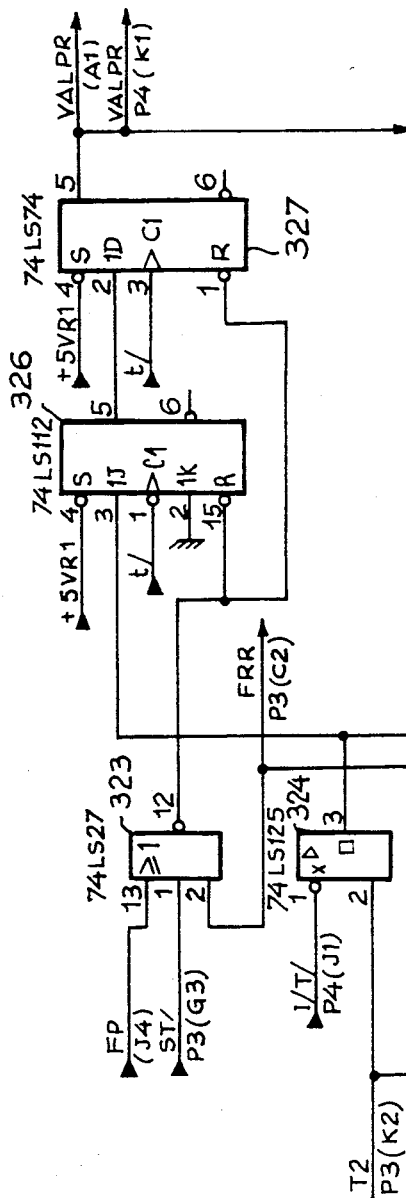
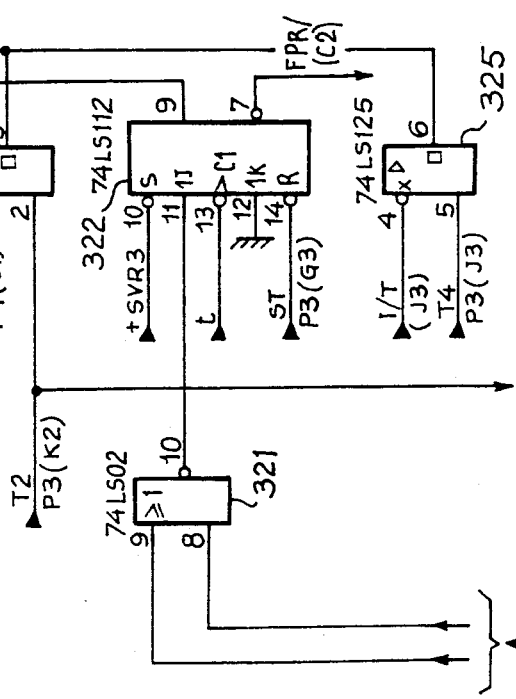
Fig.20

LOGIC SELECTION MODULE

BACKGROUND OF THE INVENTION

The present invention relates to logic selection modules, which make it possible to select on the basis of digital data signals one out of a number of similar circuits and to transmit the desired data thereto.

Automatic telephone switchboards are known in which for the actual connection network a single standard circuit reproduced a large number of times. This circuit is known under the name symmetrical time matrix (STM) and has been described in U.S. Pat. No. 4,093,827. In order to produce spatial-time paths within the connection network, it is necessary to introduce into the STM address memories the data necessary for establishing the connections within said matrix. In its existing construction the STM comprises three input terminals, one for receiving a coupling signal which validates the two others, another for receiving a series signal giving the address of the storage position to be addressed and the final one receives a series signal giving the data to be entered in the thus designated position.

Although a single STM makes it possible to establish 256 spatial-time paths, the connection network of an automatic telephone switchboard has a large number thereof. Therefore it would not be reasonable to wish to directly connect each of the STM to the central control processor of the switchboard by three separate wires connected to the previously defined terminals. This would be even less reasonable in view of the fact that the occupation level of these terminals is relatively low, because they are only used when it is necessary to make or cut out a call. It is therefore desirable to establish a pyramid-type logic device, which, on the basis of a few output terminals of the central unit, demultiplies or divides the latter in order to be able to connect them to all the input terminals of the STM. It would obviously be possible to realize this device with known integrated circuits joined together in such a way as to give the necessary logic functions. However, it is desirable to produce such an automatic telephone switchboard with a very small number of separate circuits produced with large scale integration and whose STM is known under the trade reference EFX 7331. Other circuits have also been produced with this objective in mind and in particular the terminal switching module (TSM) making it possible to bring about the interface between the PCM junction and the input STM of the connection network. This TSM is known under the reference EFX 7333. For all these circuits it is necessary to standardize the control inputs on the basis of the three terminals defined hereinbefore with the same signals to be applied to the said terminals. Thus, the structure of the circuits for directing the control signal from the central automatic telephone switchboard unit to the standard circuits of different types and particularly the STM and TSM will be the same. To further extend standardization it would then be desirable to realize a standard circuit used in a repetitive manner and without any other circuit for producing the aforementioned interface.

BRIEF SUMMARY OF THE INVENTION

The present invention therefore relates to a logic selection module for transmitting outgoing signals from one upstream device out of two to one downstream device out of eight, wherein it comprises means for receiving the call signals from the upstream devices, detecting the first call and emitting a ready signal to the first upstream calling device, means for receiving the incoming coupling, address and data signals emitted by the upstream devices and selecting under the control of the ready signal the signals emitted by the first upstream calling device, means for decoding in the address signal the address of the downstream device having to receive the signals to be transmitted, storing this address for the transmission period and emitting to the thus selected downstream device an outgoing coupling signal, and means for blocking in the incoming address and data signals, the information used by the logic selection module and transmitting to the upstream device selected by the outgoing coupling signal, the remainder of the address and data signals.

BRIEF DESCRIPTION OF THE DRAWINGS

The invention is described in greater detail hereinafter relative to non-limitative embodiments and with reference to the attached drawings, wherein show:

FIGS. 13 to 23 the detailed diagram of an LSM.

DETAILED DESCRIPTION OF THE INVENTION

An essential feature of any automatic telephone switchboard is the central control unit in the form of a specialized computer, which is always duplicated to ensure the necessary operational reliability of the switchboard. Thus, there are two central units, conventionally called unit A and unit B and which can operate in different ways. Among the most commonly adopted operating modes is that called split load, consisting of the simultaneous operation of the computers in a synchronous or asynchronous manner, as appropriate.

Figure 1:
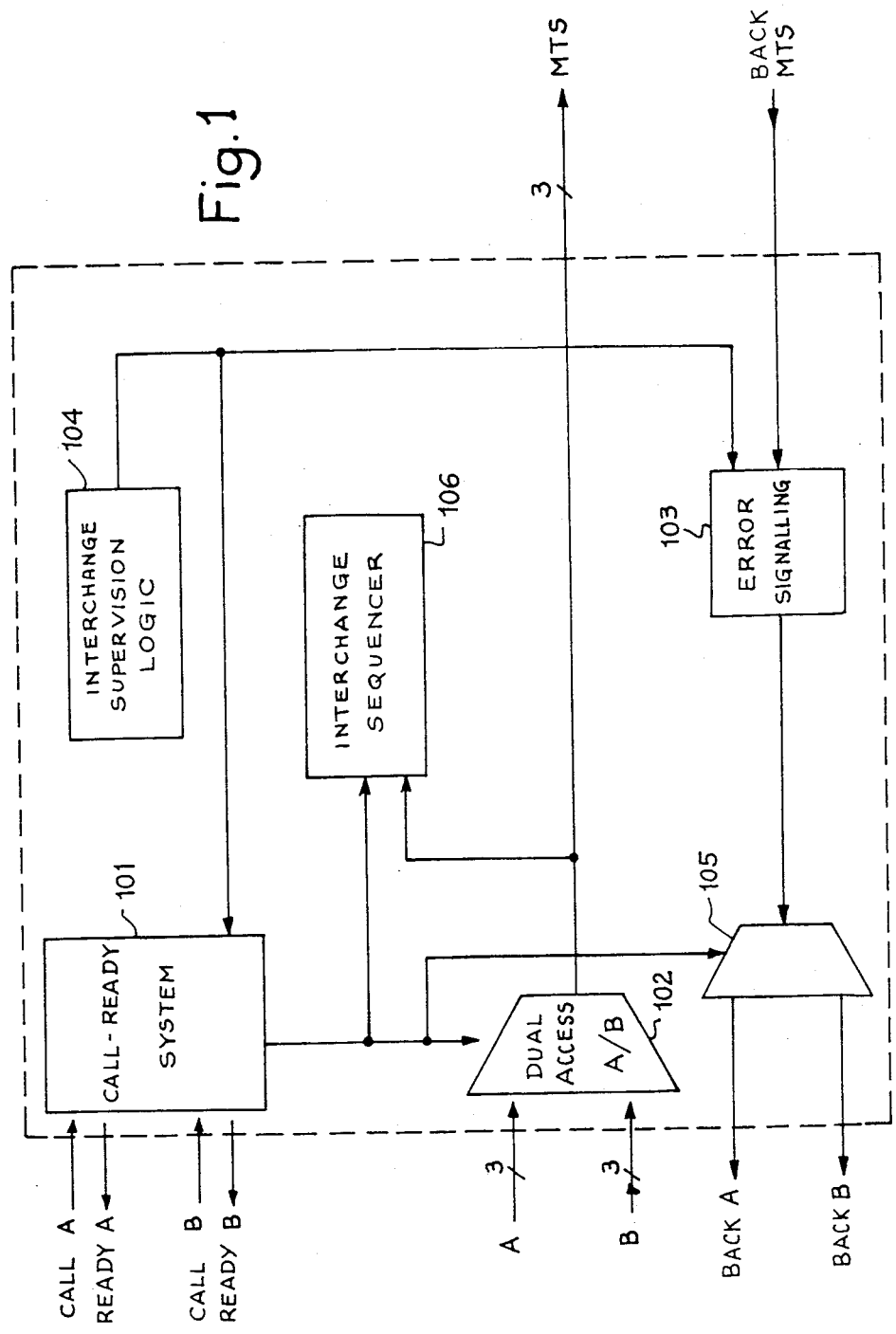
FIG. 1 a simplified block diagram of a logic selection module or LSM.

The very simplified block diagram of the LSM in FIG. 1 makes it possible to define the connections between the two central units, the controlled circuit, which is in this case an STM, and the LSM. A central unit, e.g. A, firstly emits to the LSM a call signal A. This signal is received by a call-ready system 101, which checks whether the LSM is available and in the affirmative locks it on the central unit A and returns a ready signal A to the latter. At the same time it locks the possible arrival of a call signal B from the central unit B by inhibiting the return of a ready signal B in response to a possible call signal B.

On detecting the ready signal A, central unit A then emits to the LSM one of the signals A on three wires, which then apply to a coupling signal, an address signal and a data signal. These signals are received by a dual access circuit 102, which also receives the signals B from the second central unit. Circuit 102 authorizes the passage of signals A under the control of circuit 101. On leaving circuit 102 the signals A are then passed to an output of the LSM and to the STM for which they are intended.

In accordance with a known feature, said STM then emits a signal for checking the data transmitted thereto.

This return signal from the STM comprises a certain number of keys coded by the LSM in an error signalling circuit 103 of the LSM.

The operation of the LSM is supervised by an interchange supervision logic circuit 104, which in particular frees circuit 101 at the end of a given time in order not to block the LSM if one of the central units is defective. The release signal applied in this way to circuit 101 and which consequently indicates an error of the central unit being treated at this time, is also applied to circuit 103 to be introduced into the STM return signal. The thus completed back or return signal is then applied to a circuit 105, so that it can be omitted to the calling central unit A. This selection takes place under the control of circuit 101.

In addition, the signals from the call-ready system 101 and the double access device 102 are also applied to an interchange control sequencer in the LSM.

Figure 2:
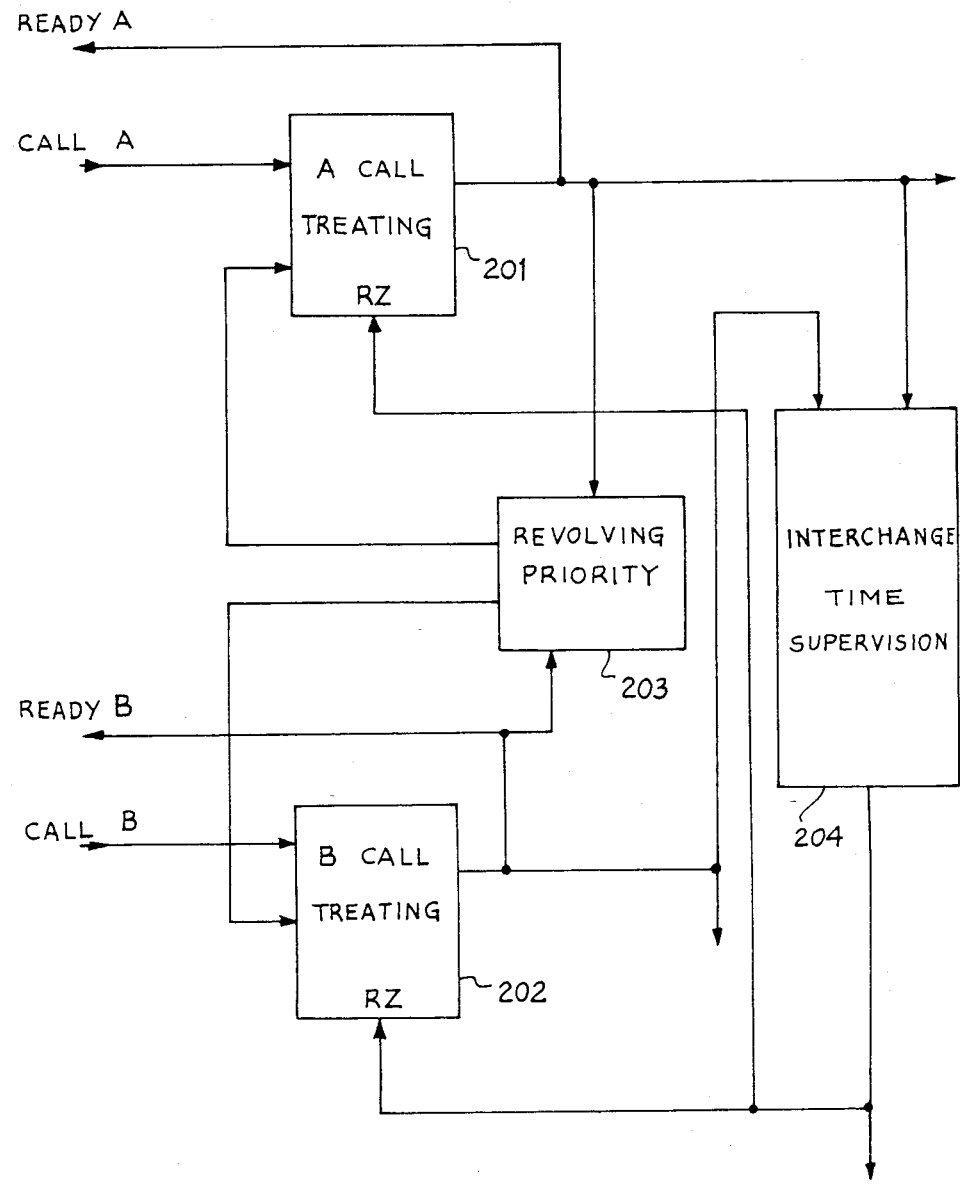
FIG. 2 a block diagram of member 101 of FIG. 1.

Circuit 101 and part of circuit 104 are shown in a very simplified manner in the block diagram of FIG. 2.

The call signals A and B are respectively applied to two call treating circuits 201, 202.

In the absence of a call a revolving priority circuit 203 alternately validates circuits 201 and 202.

When one of these circuits, e.g. 201 simultaneously receives the call signal A and the validation signal supplied by circuit 203, it switches and then emits the ready signal A. This signal is firstly applied to the output terminal connected to the central unit A. It is also applied to the revolving priority circuit 203, which stops the operation of the latter by blocking it in the position where it was located, i.e. whilst permanently validating the treating circuit of the call signal A. The ready signal A is then transmitted to the other circuits of the LSM and particularly to circuits 102 and 106. When call A falls, ready A also falls and circuit 203 is freed. It then starts to operate again, whilst alternately giving back the deal to circuits 201 and 202.

The ready signals A and B are then applied to an interchange time supervision circuit 204. If as a result of an error or fault, e.g. a blocking of central unit A, the treating time of the latter determined by the time elapsing between the rise of ready signal A and the fall of call signal A, exceeds a predetermined time, circuit 204 interrupts this treatment and then once again give back the deal to the other central unit. For this purpose it emits a resetting signal, which is applied to both circuits 201 and 202. Under the effect of this signal, the blocked circuit interrupts emission of the ready signal, which puts back into operation circuit 203 and brings about the fall of the resetting signal supplied by circuit 204. Circuit 203 can then give back the deal to the other call treating circuit.

Figure 3:
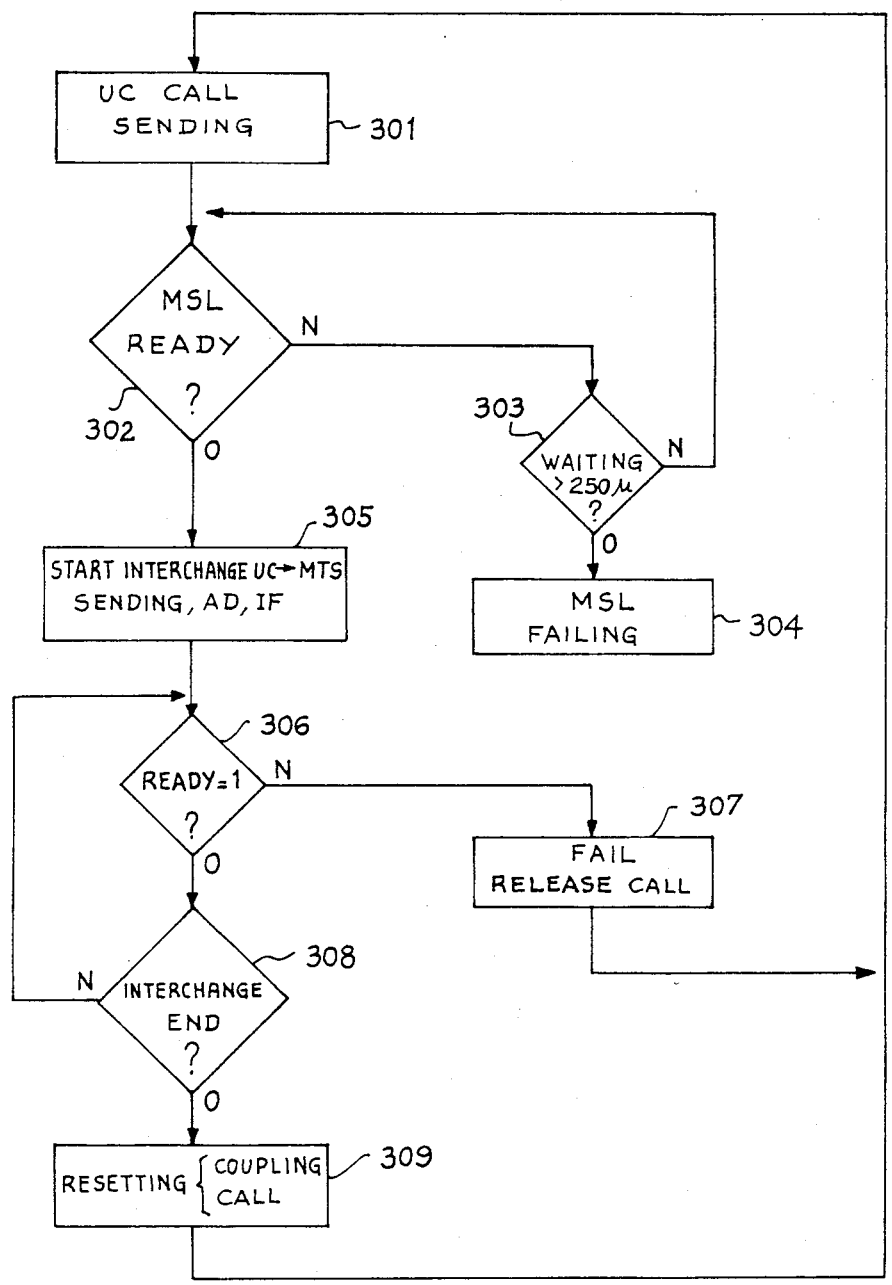
FIG. 3 and FIG. 4 operating flowcharts of an LSM.

FIG. 3 shows the marking flowchart of an STM from a central unit via an LSM. The initial stage 301 corresponds to a call from the central unit transmitted to the LSM in the form of the call signal. Stage 301 is followed by a test stage 302 in which a check is made to establish whether the LSM is ready. In the negatives, one passes on to a stage 303 in which a check is made to establish whether the time which has elapsed since the call signal was transmitted exceeds 250 microseconds. In the negative there is a return to stage 302.

When the wait exceeds 250 microseconds a stage 304 is reached in which the central unit detects that the LSM is defective and takes the appropriate measures. If the LSM is not defective it replies with a ready signal before the end of the 250 microsecond period.

It is then possible to pass on to stage 305, corresponding to the start of data transmission from the central unit to the STM. The data correspond to the transmission of the three signals, i.e. coupling, address AD and information INFOS.

Whilst this exchange is taking place, there is a permanent check to establish whether the ready signal is present during a stage 306. If the ready signal falls, one passes on to stage 307 corresponding to a fault downstream of the central unit which, on detecting the fault, releases the call so that the other central unit can take the deal and its call restarted during the following cycle.

The test on the ready signal is followed by a test on the end of the interchange, i.e. the end of the transmission of the three signals to the STM. If this interchange is not at an end, one continues with test 306. When the interchange is at an end, the central unit brings about the fall of the coupling and call signals in stage 309 and recommences at the start of the flowchart for the following call.

Figure 4:
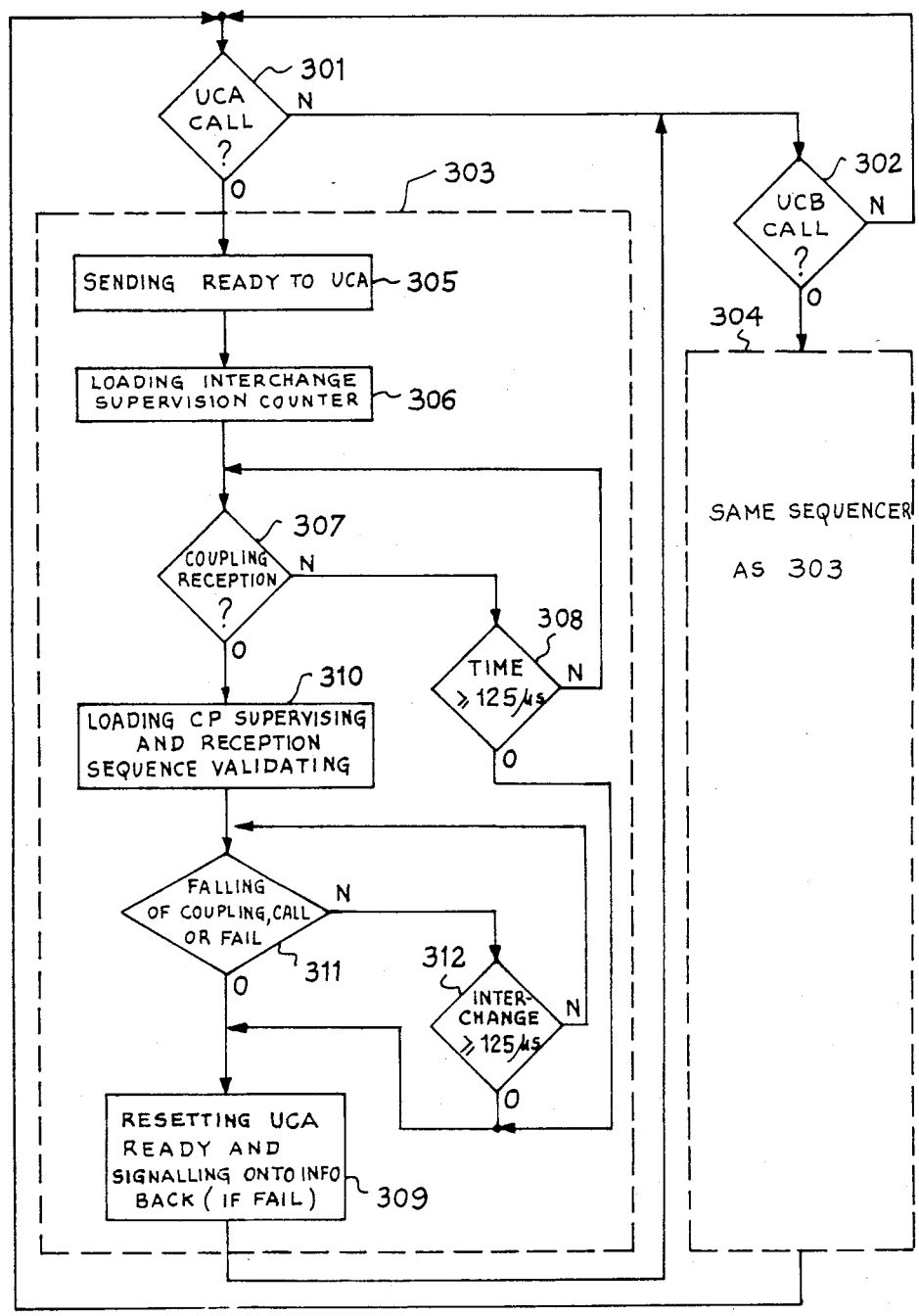

The asynchronous mode alternation between the interchange with central unit A and central unit B is shown in the flowchart of FIG. 4. The first stage 301 is a test on the interchange call by central unit A. If there is no call, we continue with a test 302 on the interchange by central unit B. If there is a call we pass on to sequence 303, which will be described hereinafter and which is terminated by a return to test 302. If there is no call in test 302 we return to test 301. If there is a call in test 302, we pass on to a sequence 304, which is identical to sequence 303 and at the end of which there is a return to test 301.

Sequence 303 starts with a ready signal transmission stage 305 to central unit A. This stage is followed by a stage 306 in which the counter, which supervises the duration of the interchanges is loaded. Stage 306 is followed by a test 307 on the reception of the coupling signal from the central unit. If this signal is not received, we pass on to a test 308 on the content of the supervision counter, i.e. on the time which has elapsed since it was loaded. If this time is below the prescribed wait time of 125 microseconds, we continue with test 307.

When the time exceeds this prescribed time, we pass from test 308 to a stage 309 where the ready signal transmitted to central unit A is reset.

If the coupling signal is received before the end of this prescribed time, we pass to a stage 310 in which the supervision counter is again loaded and in which the members determining the sequencing of the reception and the transmission of the signals having to traverse the LSM are validated.

Stage 310 is followed by a test 311 on the fall of the coupling or call signals and on a random volt or error, e.g. a parity fault in the transmission of the signals. If none of these faults has occurred, we pass on to test 312 on the content of the supervision counter, which tests whether the time since its loading is greater than or less than the prescribed time of 125 microseconds.

If the time is less, we return to test 311 and when it exceeds 125 microseconds we pass to stage 309.

Figure 5:
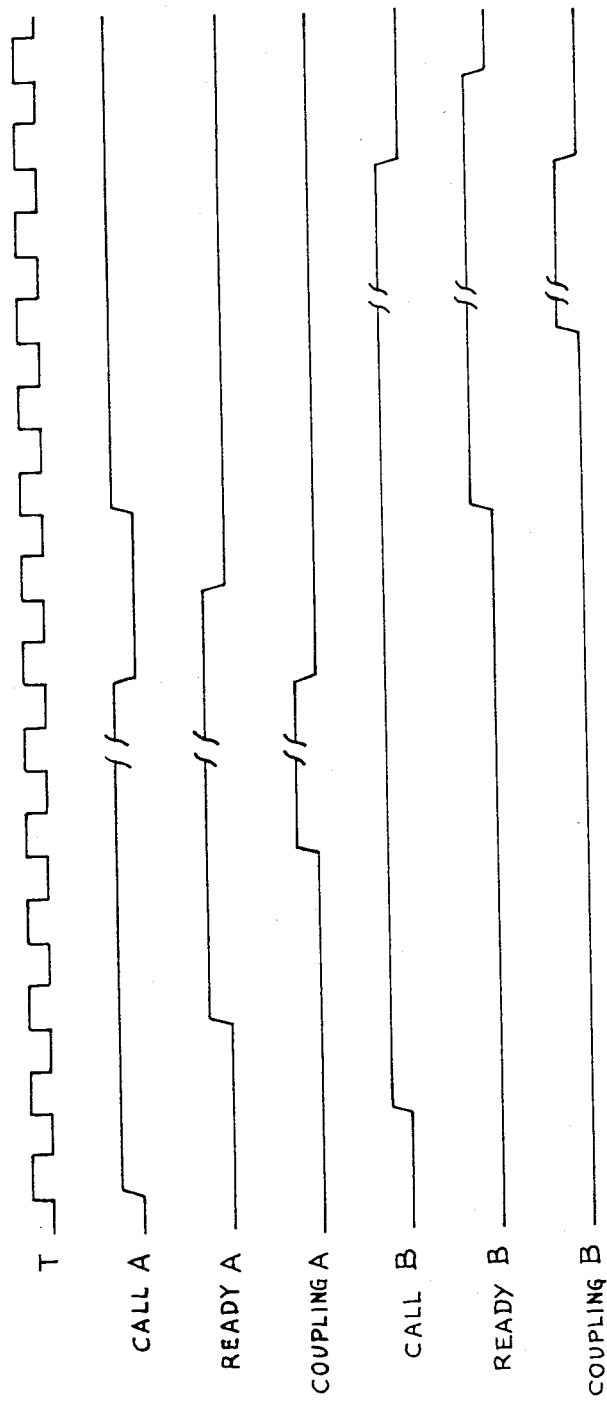
FIGS. 5, 6, 9, 10, and 12 interface signal sequences of an LSM.

When there is a fall of the coupling or call signal or a parity fault, we also pass to stage 309. The output of stage 309 corresponds to the output of test 303. The sequence of the signals in the case of a call from central unit A followed by a call from central unit B is shown in FIG. 5.

On line T there are the timing or clock signals, which determine the sequencing of the complete circuit. Call signal A rises on the rising front of a first timing signal. Call signal B transmitted by central unit B rises on the rising front of the following timing signal.

The LSM responds by the rise to the second following timing signal of the ready signal A, which is normal because it is central unit A which is called first. The latter replies by the rise of the coupling signal A to the fourth following timing signal corresponding to call A.

In response to the subsequent fall of call A and coupling A, the LSM brings about the fall of ready signal A with a time lag equal to 1 clock cycle and brings about the rise of ready signal B with a time lag equal to 1 clock cycle on the fall of ready A, because call B is still present.

The interchange with central unit B then takes place under the same conditions as for central unit A.

Operation in the synchronous mode is not associated with a particular feature of the LSM, it being instead linked with the operation of the two central units A and B.

Figure 6:
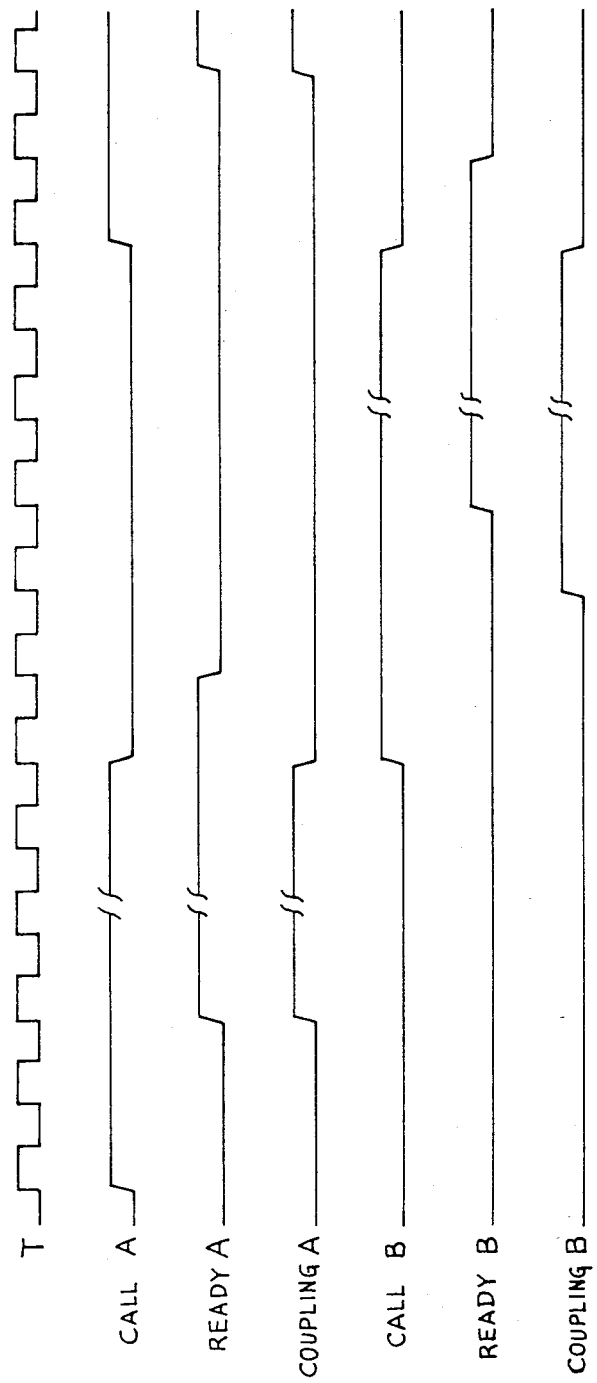

Thus, in this mode these central units know that they are working in synchronism and transmit their signals alternately in such a way as not to encroach on one another. The interchange corresponding successively to A and then B is shown in FIG. 6 in the same way as for FIG. 5.

There again it starts at a clock time T with the rise of the call signal A. However, unlike in the asynchronous mode, it continues at the end of two clock periods by the simultaneous rise of the ready signal A and coupling signal A. Thus, coupling signal A is transmitted without waiting for the reception of ready signal A, because central unit A knows that only it is emitting. At the end of the exchange call signal A and coupling signal A fall, followed at the end of a clock period by the fall of ready signal A.

At this time when call A and coupling A fall, the call signal B rises, which is one of the features of operation in the synchronous mode because central unit B has transmitted its call knowing from its internal program that the call of A falls at this time. This transmission of call signals is only necessary in this mode for bringing about the operation of the LSM and not for bringing about a succession of interchanges with the two central units by a call-answer system.

At the end of the necessary two clock periods, coupling signal B rises independently of the arrival of ready signal B, which only takes place to within a time period. This is another feature of operation in the synchronous mode. Exchanges then take place until they are completed with central unit B and the call signal B and coupling signal B fall simultaneously.

Figure 7:
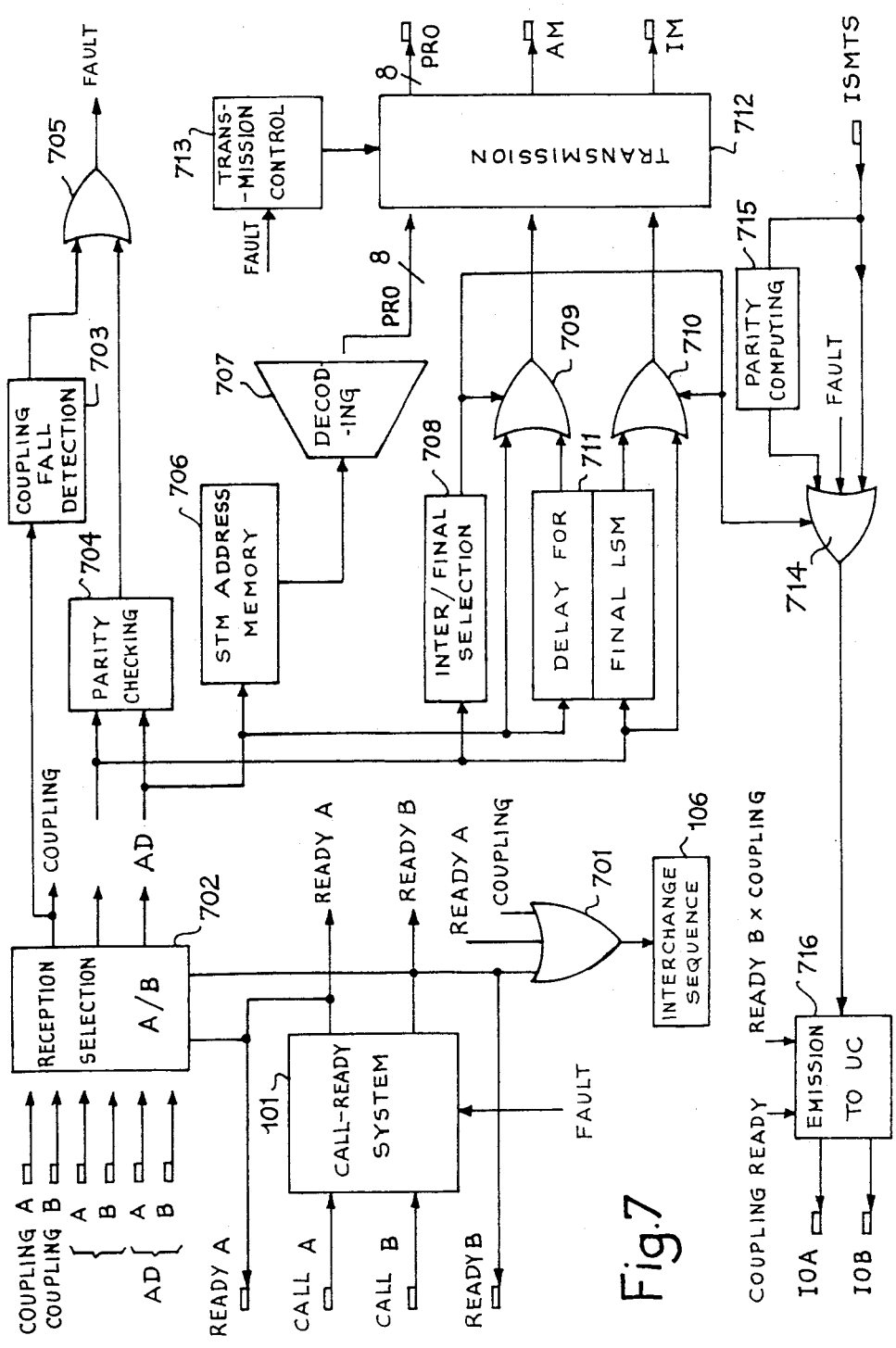
FIG. 7 an intermediate block diagram of an LSM.

The block diagram of FIG. 7 is more complete than that of FIG. 1 and makes it possible to show in greater depth the data interchanges between the central unit on the one hand and the STM on the other.

Call signals A and B are applied to a call-ready system 101, which supplies ready signals A or B in the manner shown hereinbefore. In the same way these ready signals A and B are applied via an OR gate 701 to an exchange sequencer 106, which manages the operation of the other circuits. They are also applied to two output terminals forming part of the interface of the LSM and to a reception/selection circuit 702.

The input terminals of the LSM are connected to the reception/selection circuit. These terminals respectively receive the coupling A, coupling B, info A, info B, address A (ADA), and address B (ADB) signals. This reception/selection circuit makes it possible, under the control of the ready signals A or B, to allow the passage of those coupling, info and address signals which correspond to those of the central units A or B which have been selected on the basis of its call to which the LSM has replied with ready.

The thus selected coupling signal is supervised by a coupling fall detection circuit 703 making it possible to supervise the validity of the information received from the central unit. If this signal falls, circuit 703 emits a fault signal.

The information and address signal selected by circuit 702 are themselves controlled in a circuit 704, which monitors the parity of the signal. In the case of a parity fault, another fault signal is transmitted.

The fault signals emitted by circuits 703, 704 are collected by an OR circuit 705, which supplies a fault signal constituted by one or other of these two signals.

The coupling signal is also applied to the OR gate 701 by means of which it operates the interchange sequencer 106.

The address signal is applied to a memory circuit 706 containing the address of the STM which is to be selected by the LSM. This address is decoded in a decoder 707, which supplies a coupling signal from the STM PRO on one out of eight wires selected on the basis of said address.

The start of the information signal is firstly analyzed with a circuit 708 making it possible to see whether the LSM receiving the signals from the central unit is in an intermediate or final position, as will be seen hereinafter.

The signal resulting from this analysis is applied to two selection circuits 709, 710, respectively receiving the information and address signals and transmitting them directly if the LSM is in the intermediate position.

These circuits 709 and 710 also receive the information and address signals via a delay device 711 used for delaying them by a predetermined period when the LSM is in the terminal position, i.e. when its output signals act directly on an STM.

The coupling signals from the decoder 707 and the information and address signals from selection circuits 709 and 710 are all applied to a transmission circuit 712, which enables them to be transmitted to adequate output connection terminals of the LSM. Thus, these terminals comprise eight coupling terminals PRO, one address terminal AM and one information terminal IM.

Transmission is controlled by a circuit 713 controlled by exchange sequencer 106. Circuit 713 also receives the fault signal, which blocks transmission in the case where a fault of the type defined hereinbefore is detected.

The STM IS signals from the STM are applied to a controlled OR circuit 714, which also receives the fault signal and a parity signal calculated on the basis of the return signal of the STM by a circuit 715.

The return signal formed in this way by the addition of these three separate signals is applied to a circuit 716 for transmission to the central unit supplying the two output terminals of the IAO and IOB signals passed to the corresponding central units. This circuit makes it possible to emit the return signal to the calling central unit. Circuit 716 also receives two transmission authorization circuits obtained by not shown, conventional circuits and which function on the basis of the coupling and ready A and B signals.

Figure 8:
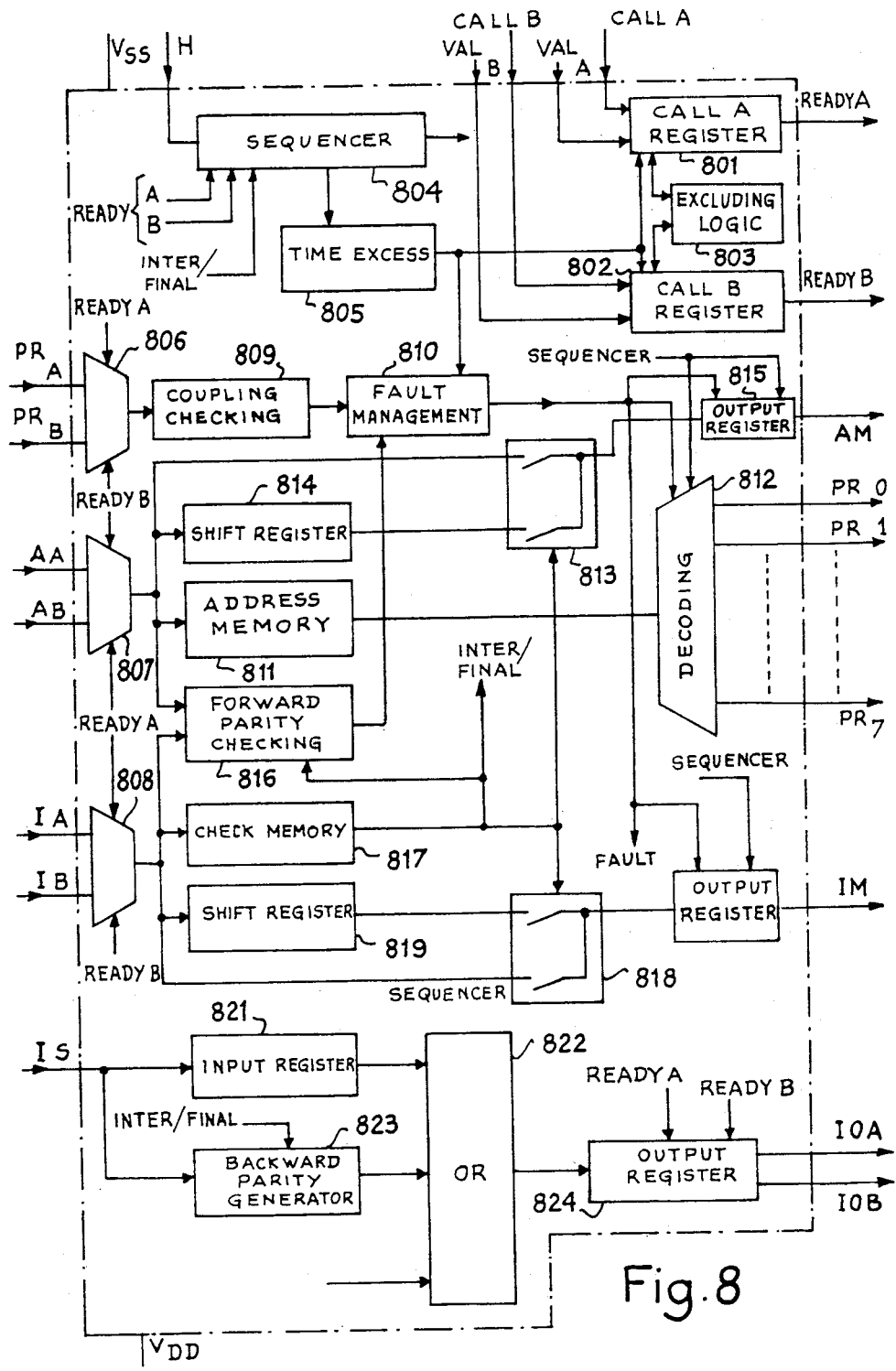
FIG. 8 a detailed block diagram of an LSM.

The complete block diagram of the LSM as integrated into a large-scale integration circuit is shown in FIG. 8 with all the external connections of said circuit and the functional blocks contained therein. This block diagram will be described with the sequencers of the different signals which have already been described relative to FIGS. 5 and 6 and which will also be described, as appropriate, with respect to the following drawings. For reference purposes the two input terminals VSS and VDD are indicated, which make it possible to apply the supply voltage to the circuit.

Call signals A and B respectively reach the call registers 801, 802. As the standard box housing the LSM normally has 28 pins, the two pins which are left free are used for applying validation signals VALA and VALB to registers 801, 802. Thus, the call signals are only treated on the same register the call and validation signals rise together. This makes it possible to use the LSM in a matrix arrangement, thereby extending the possibility of use thereof.

Thus, each call register stores the validated call for the duration of the transfer sequence and supplies ready signal A at the end of two clock cycles defined in FIGS. 5 and 6 and ready signal B at the end of three clock cycles.

A circuit 803 contains an excluding logic which, when a call is received on one of the registers, makes it possible to block the arrival of the other when operating in the asynchronous mode. A simple system for obtaining this exclusion logic consists of operating one of the registers on the bar signal of the other. Thus, when one of the registers can receive the call, the other cannot, so that which is in a state to receive the call will automatically block the other, even if it has received a simultaneous call.

The ready signal which is then emitted, initiates a sequential circuit or sequencer 804, which is in fact a counter operating on the basis of the timing signal H arriving on one terminal of the circuit. This timing signal can be the general 2 MHz timing signal used in PCM circuits and which is the general clock of a time switching automatic switchboard. A different frequency, e.g. 64 KHz can be used for H.

The states of this counter are decoded so as to supply the different times necessary within the LSM. One of these times corresponds to the duration of 125 microseconds which, as has been shown hereinbefore, forms a limit for the operating time of the MSL, as from which the latter automatically switches to the other central unit. Any exceeding of this time is controlled in a circuit 805, which, if applicable, supplies a signal which resets the two call registers 801, 802.

The calling central unit can then emit the three signals, namely the coupling signal PRA (PRB) the address signal AA (AB) and information signal IA (IB). The three signals of each of the central units respectively arise at the corresponding input terminals.

Under the control of the ready A or B signals, selection circuits 806 to 808 are in each case able to select each of the coupling, address and data terminals corresponding to the central unit authorized to emit. These circuits merely serve as electronic switches.

The thus selected coupling signal is applied to a coupling fault checking circuit 809, which merely monitors the unforeseen fall of the signal for the duration of the interchanges, which corresponds to one fault. If this signal falls, circuit 809 then transmits a fault signal to a fault management circuit 810, which collects the different faults liable to occur during the exchanges.

Figure 9:
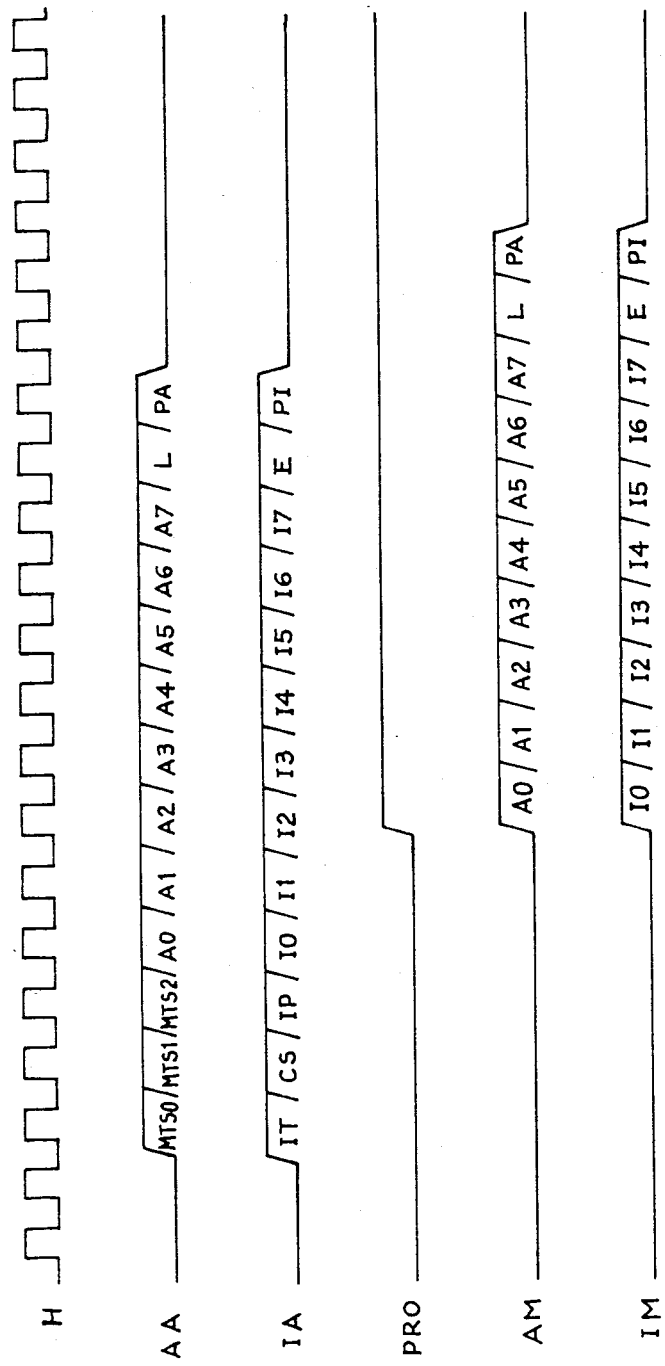

Reference will now be made to FIG. 9, which is a signal sequencer and it is assumed that central unit A is involved. The upper line represents clock H, which is present on all the sequencers.

Address signal AA is applied to circuit 807 with a delay of one and a half cycles due to the synchronous operation of the selection circuit and successively comprises three STM bits 0 to 2, which give the address of the STM to which are to be transmitted the data from the central unit and branched by the LSM. It then comprises eight bits A0 to A7, which must be transmitted to the selected STM in order to designate there the address of the storage position to be marked. It then comprises a bit L, which is a read or non-read instruction in the selected STM and a bit PA giving the parity of the nine preceding bits.

This output signal of circuit 807 is firstly applied to an address memory 811 loaded by the first three bits STM0 to 2, which remain there until the end of the exchanges. These three bits are then transmitted in parallel to a decoding circuit 812, which makes it possible to decode the address of the selected STM. Under the control of sequencer 804, the decoding circuit then transmits a coupling signal on one of its eight outputs PR0 to PT7 connected to the eight corresponding output terminals of the LSM. As a result of the sequencer it is possible to delay to a greater or lesser extent the output of the coupling signal according to the requirements which will be explained hereinafter.

Signal AA is also applied to a selection circuit 813, either directly or via a shift register 814, for reasons which will be described hereinafter. The output of selection circuit 813 is applied to an output register 815, which itself supplies the output signal AM for the eight STM connected to the LSM.

The sequencer supplies a control signal to the said output register and makes it possible to block the passage of the three STM bits 0 to 2, which have not been transmitted to the selected STM, because they serve for the selection of the same via decoding circuit 812.

If appropriate, register 815 also receives a blocking signal from the fault management circuit 810 enabling it to interrupt emissions in the case of a fault. This signal is also applied to decoding circuit 812 in order to block it in the same case.

Shift register 814 makes it possible to delay signal AM on output by three clock cycles. Thus, the STM can reject the input signals applied thereto during seven clock cycles after the start of transfer. To ensure that it does not treat signals which have been recognized as erroneous with respect to the LSM, the output signals are delayed in such a way that the interchange lasts no longer than seven clock cycles when the parity bit PA is decoded in the LSM. If this bit indicates an error, the coupling signal PRO falls and the selected STM does not treat the signals supplied to it and which were erroneous. The signals which are then transmitted are those indicated on line AM of FIG. 9.

Signals AA are also applied to a forward parity checking circuit 816, which calculates the parity of bits MTS 0 to L and comprises the result of this calculation with bit PA. If the result is not correct, it omits a fault signal, which is applied to the fault management circuit 810, which then blocks the decoding circuit 812 and the output register 815.

Data signal IA from the central unit and applied to selection circuit 808 starts at the same time as signal AA. It firstly comprises a bit IT, which indicates in the manner shown hereinafter whether the LSM is in the intermediate or final position. It then comprises a bit CS, which is not used for the moment and which is placed in reserve for subsequent versions of the LSM. It then comprises a parity bit IP, which is calculated on the five bits STM 0 to 2, IT and CS. It then comprises eight data bits I0 to I7, which are to be written into the memory position of the STM, whose address is given by the eight bits A0 to A7. It is terminated by a writing bit E and by a parity bit PI on all the bits IT to E.

At the output of circuit 808, signal IA is firstly applied to a check memory 817, which stores the first bit IT and emits a signal which, as a function of the value of said bit, indicates whether the LSM is in the intermediate or final position. Throughout the interchange period this signal is applied to the selection circuit 813 and to a selection circuit 818, identical to circuit 813 and whose function is the same. Circuit 818 receives signal IA on the one hand directly and on the other hand via a shift register 819 homologous of circuit 814 and whose function is the same.

The signal selected in this way by circuit 818 is applied to an output register 830 homologous of circuit 815 and which also receives the same signal from sequencer 804 as circuit 815, so that the first three bits of data signal IA can be blanked out.

Output register 820 also receives, if appropriate, from fail circuit 810 a blocking signal, which blocks its output. It emits to an output terminal of the LSM, signal IM having in series the eight bits I0 to I7, bit E and bit PI.

The output signal of circuit 808 is finally applied to the forward parity checking circuit 816, which makes it possible to calculate the parities corresponding to bit IP and to bit PI. In the case of a fault circuit 816 also transmits a signal to the fault management circuit 810, which has the same consequences as a parity fault on PA.

The thus selected STM, which has received the address and data information, processes it and in return generally transmits a control signal for the central unit. This signal is normally formed from the content of the selected memory position, which is either read without writing or is written and then read.

Figure 10:
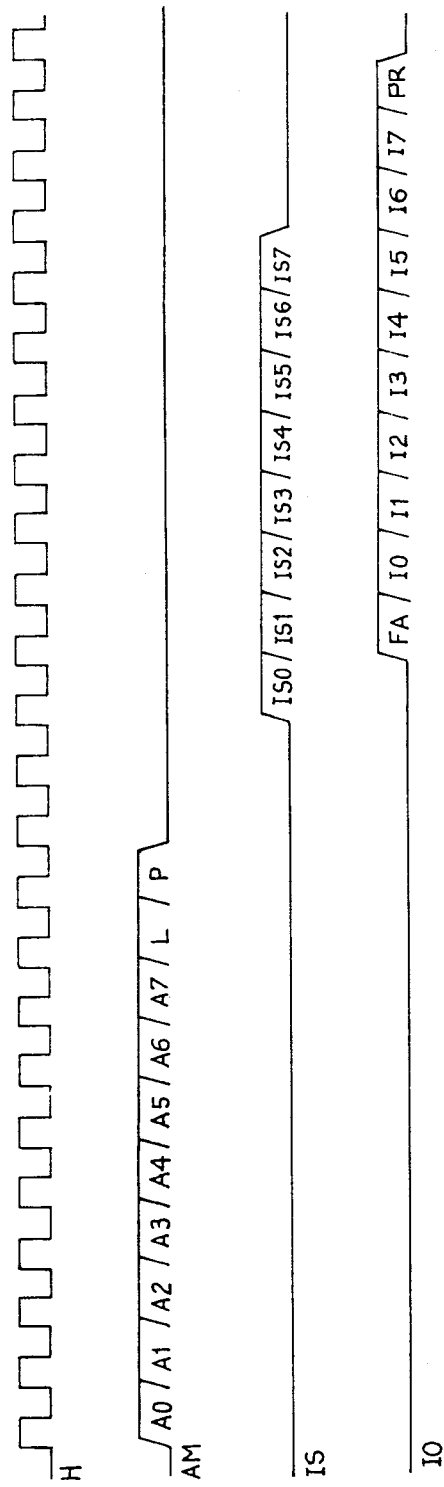

This return signal IS from the STM is shown in FIG. 10 under timing signal H and address signal AM. It consists of bits IS0 to IS7.

It is firstly applied to an input register 812 permitting it to be delayed by one clock cycle enabling a bit FA to be placed at the head of this signal indicating, if appropriate, a forward parity fault or a coupling signal fall. For this purpose the output of the fault management signal 810 is applied to an OR circuit 822, which also receives the output of register 821. Signal IS is also applied to a forward parity generator 823, which calculates the parity of the bits IS0 to IS7 and supplies a bit PR, which immediately follows bit I7. The output of generator 823 is also applied to the OR circuit 822, so as to place this backward parity bit after the return data bits.

The output signal of the OR circuit is then applied to an output register 824, which then delays the complete signal formed in this way by one clock cycle due to its synchronous operation and has two separate outputs at which appear signals I0A and I0B. Depending on which of the central units connected to the LSM has called, the return signal is transmitted to one or other of the two outputs corresponding to these two signals. A single LSM directly controlled by a central unit only makes it possible to directly address eight STM.

Figure 11:
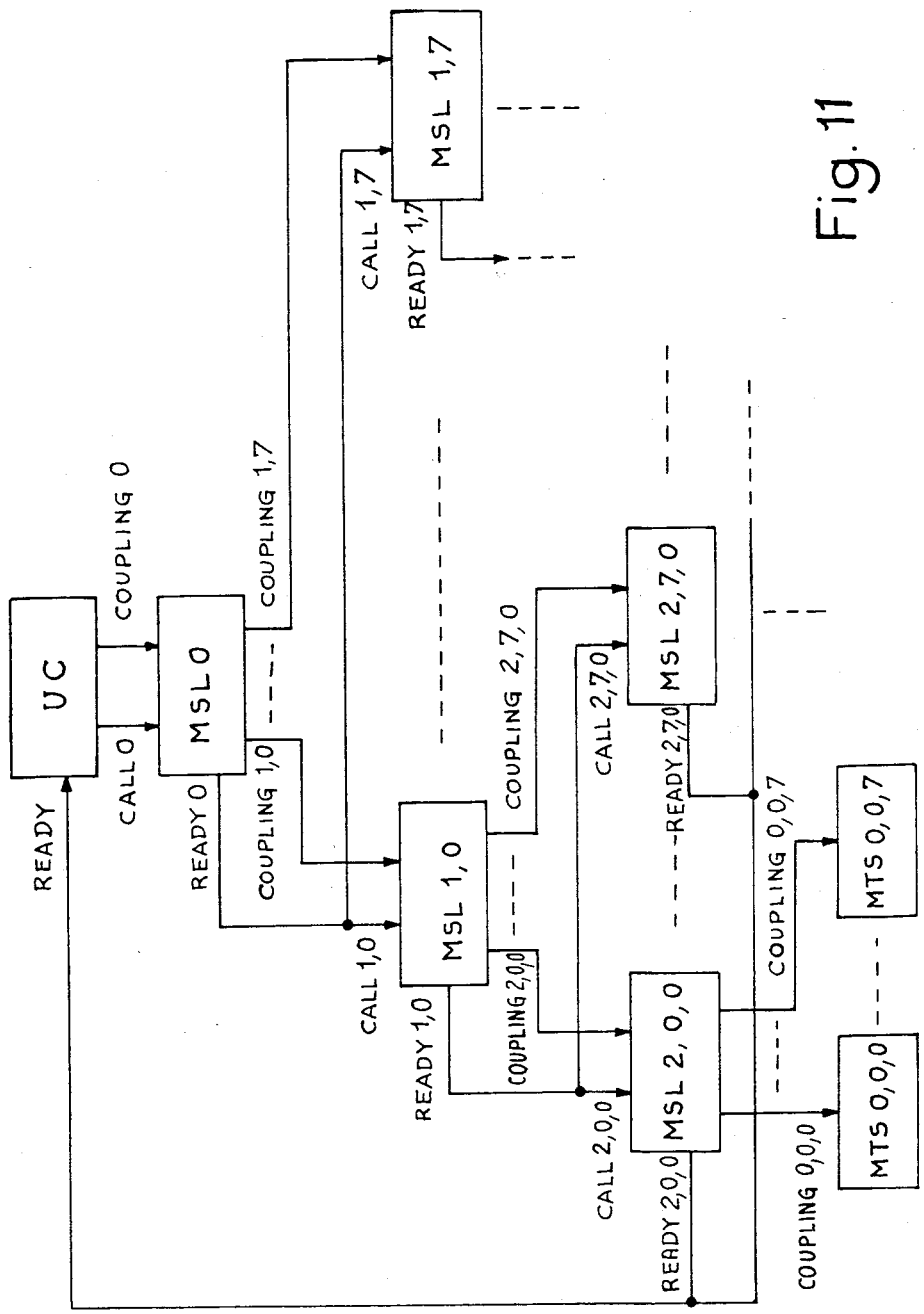
FIG. 11 an example for the use of an LSM assembly.
Figure 12:
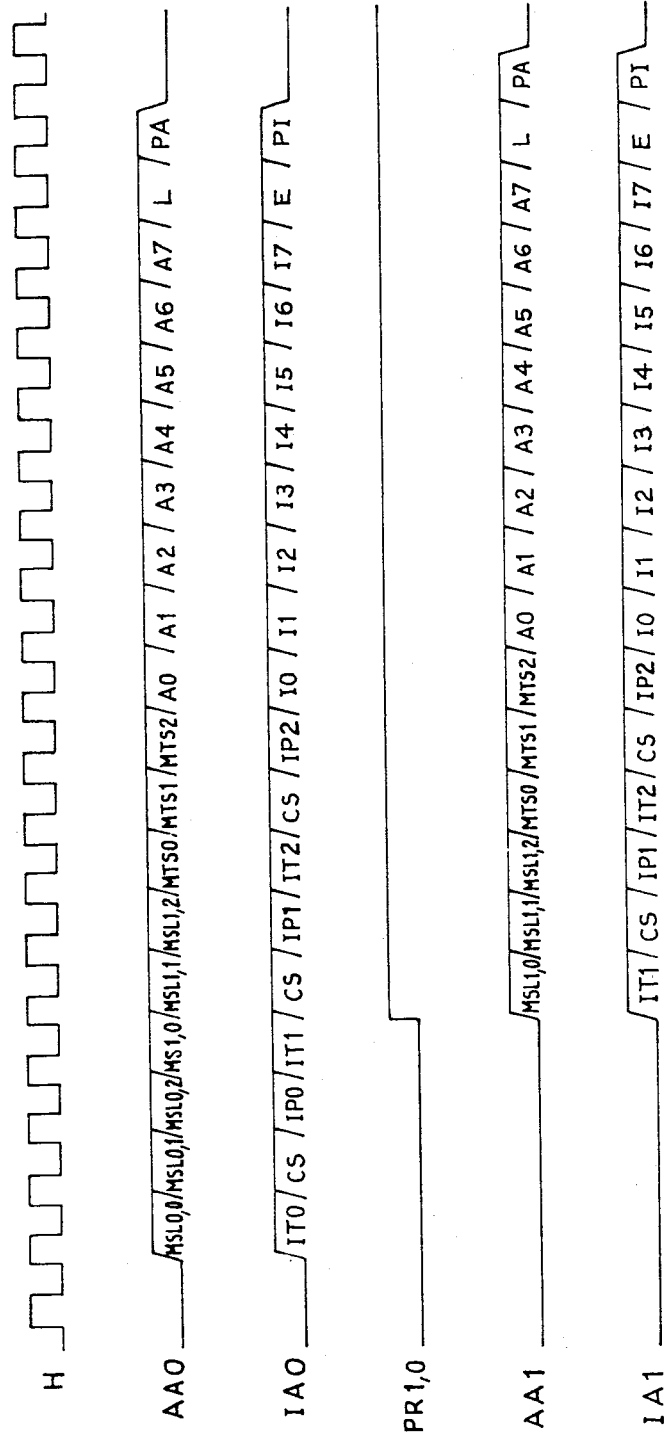

In order to increase this capacity, it is necessary to associate therewith a plurality thereof in order to demultiply the demultiplication possibilities. The LSM permits such as association in accordance with various diagrams. One of these diagrams is shown in FIG. 11 which, for reasons of clarity, is limited to a single central unit, whereas there are always two, to a single branch of the tree obtained in this way and finally to only those connections corresponding to the call-ready signals. In fact once the call-ready system has selected the desired branch, the other signals will cascade in the direction from the central unit to the STM for the marking information and in the opposite direction for the return information.

Central unit UC then emits a call signal 0 to LSM0, which forms the first selection stage. The latter replies with a ready signal 0 addressed in parallel to the eight LSM 1, 0 to 1, 7 forming the second stage. Thus, this signal forms the eight call signals 1, 0 to 1, 7 intended for the said eight LSM. In reply the latter respectively emit the eight ready signals 1, 0 to 1, 7. Each of these ready signals is then emitted in parallel to eight LSM of the third selection stage. Thus, the latter comprises $8 \times 8 = 64$ LSM, with LSM 2, 0, 0 to 2, 7, 0 connected to LSM 1, 0 of the second stage.

For this purpose the ready signal 1, 0 becomes the call signals 2, 0, 0 to 2, 7, 0. In reply to these call signals all the LSM of the third stage reply by a ready signal, whose ready signals 2, 0, 0 to 2, 7, 0 of the preceding LSM.

All these ready signals of the third stage are then collected in a wired OR circuit to form the return ready signal applied to the central unit.

On receiving this ready signal the central unit knows that all the LSM are available for receiving the coupling signal. It then transmits a coupling signal 0 to LSM 0 and then the address and data information AA0 and IA0 respectively, which are represented on the sequencer of FIG. 11 beneath the timing signal H.

As compared with the address and data information intended for a selection by a single LSM, they consist of supplementary information consisting of three bits per supplementary stage for each address and data signal. Thus, before the three address bits of the final STM 0 to 2, signal AA0 successively comprises three address bits of the LSM of the second stage LSM 0,0 to LSM 0,2 and then three address bits of the LSM of the second stage LSM 1, 0 to LSM 1,2.

As it is also necessary to indicate to the LSM of the intermediate stages that they are in fact in the intermediate position and place a parity bit and a padding bit to respect the equality of the formats between the address bits and the data bits, before the three bits IT2, CS and IP2 intended for the LSM of the final stage, signal IA0 successively comprises three bits IT0, CS, IP0 intended for LSM 0 and three bits IT1, CS, IP1 intended for the LSM selected by that preceding it in the intermediate stage. Thus, the three first bits of signal AA0 are decoded in LSM 0, which gives the address of the LSM selected in the second stage, i.e. for example LSM 1,0.

LSM 0 then transmits a coupling signal 1,0 to the corresponding output terminals, which is connected to the input coupling terminal of LSM 1,0, which can then receive the information transmitted thereto from LSM 0, whereas the seven other LSM of the second stage to which are applied said information in parallel with LSM 1,0 cannot treat them because they receive no coupling signal.

In its check memory, LSM 0 decoded bit IT0, which indicates to it that it is placed in the intermediate position. This has the effect of positioning selection circuits 813 and 818 in such a way that shift registers 814 and 819 are not used and the signals pass directly to the output registers 815 and 820. Thus, as the following circuit is an LSM it is not useful to delay the signals in such a way that they are not treated in the case of the detection of an error in the LSM.

However, the three address bits of the start of signal AA0 and the three bits at the start of signal IA0 are not useful. As nothing distinguishes them, except their location at the start of the message, it is imperative that they are not transmitted. For this purpose the intermediate/-final signal decoded in check memory 817 is supplied to sequencer 804 which, via decoder 812, controls the output of coupling signal PR, 0. This delay is four clock cycles, three for bringing about the disappearance of the first three bits of each information signal and one for taking account of the synchronous delay due to the output register. At the same time the signal from the sequencer and which is applied to the output registers, blocks the latter to ensure reliability of transmission. Thus, at this time the signals at the output of MSL 0 become signals AA1 to IA1.

In the second stage, e.g. in LSM 1, 0 the same treatment is performed for selecting one of the LSM of the final stage and for eliminating the first three bits corresponding to the latter LSM from the header of the information signals. Thus, the signal which reaches it will be identical to that reaching a single LSM and as represented on the sequencer of FIG. 9.

With regards to the return signals, the LSM directly connected to the STM carries out the return parity calculations and the addition of the forward parity check. The other LSM's of the return branch are completely transparent to the return signal. For this purpose the intermediate/terminal signal from the check memory 817 is applied to the parity check circuit, which controls IP and inhibits PI. Moreover, this same intermediate/terminal signal is applied to the return parity generator 823, and inhibits the latter, so that the return signal traverses in a perfectly transparent manner registers 821 and 824 where it merely undergoes a delay. These return circuits are obviously connected in accordance with a cabled OR gate, because there is then a move up the pyramid again towards the central unit via the LSM.

As has been shown hereinbefore an LSM is constructed in the form of an integrated circuit with 28 terminals. This integrated circuit is obtained by integrating functions shown in the diagram of FIG. 8 and an intermediate stage of said integration consists of producing a printed circuit card having for the exterior exactly the same operation as an LSM, but produced from discreet integrated circuits. The diagram of this integrated circuit card is shown in FIGS. 13 to 23 taken together, in accordance with standard conventions in connection with discreet integrated circuits. Thus, throughout the remainder of this text, all that will be given is the correspondence between these discreet integrated circuits and the blocks of the block diagram of FIG. 8, the very formation of this card directly giving a circuit operating in the manner described hereinbefore.

Figure 13:
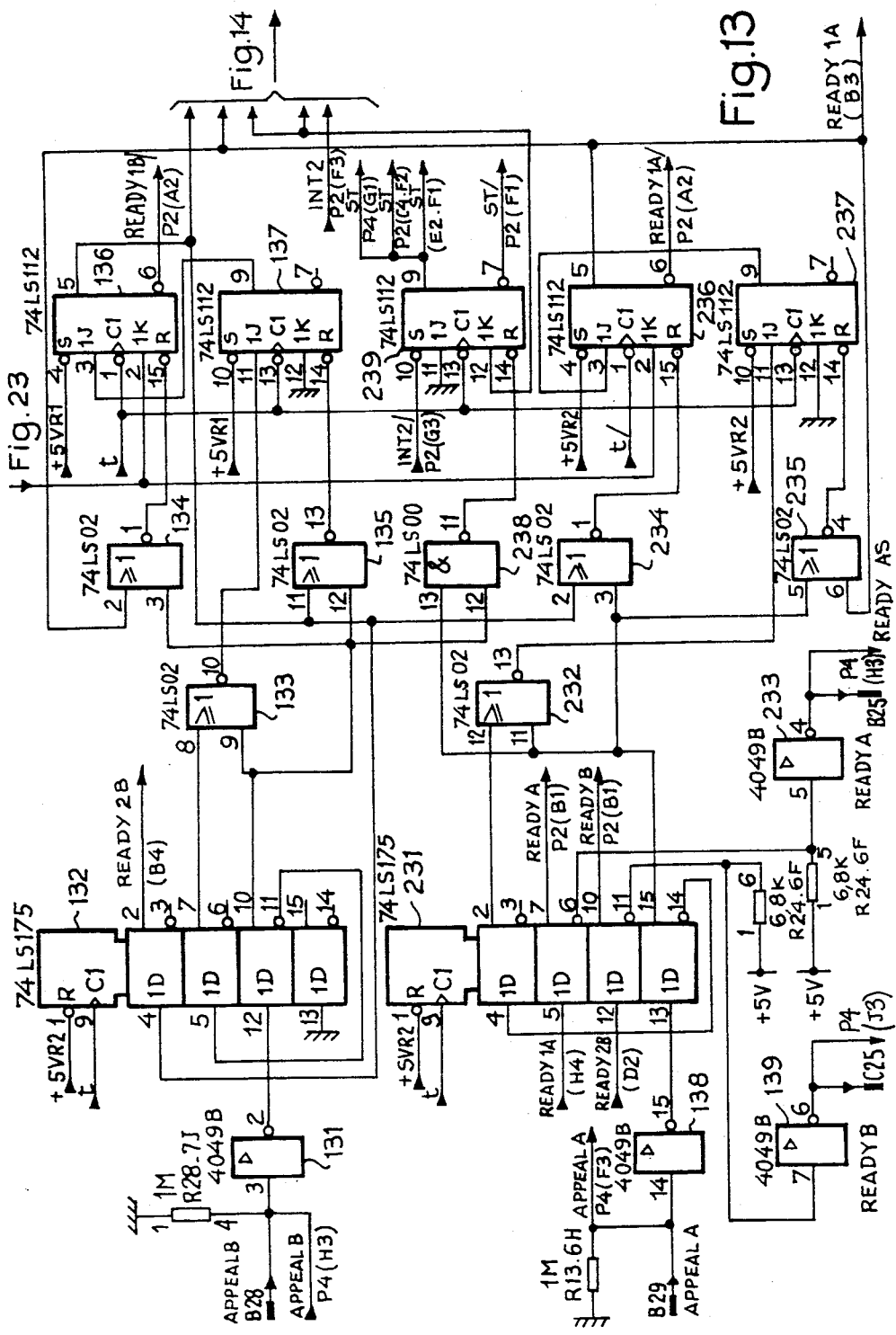
Figure 14:
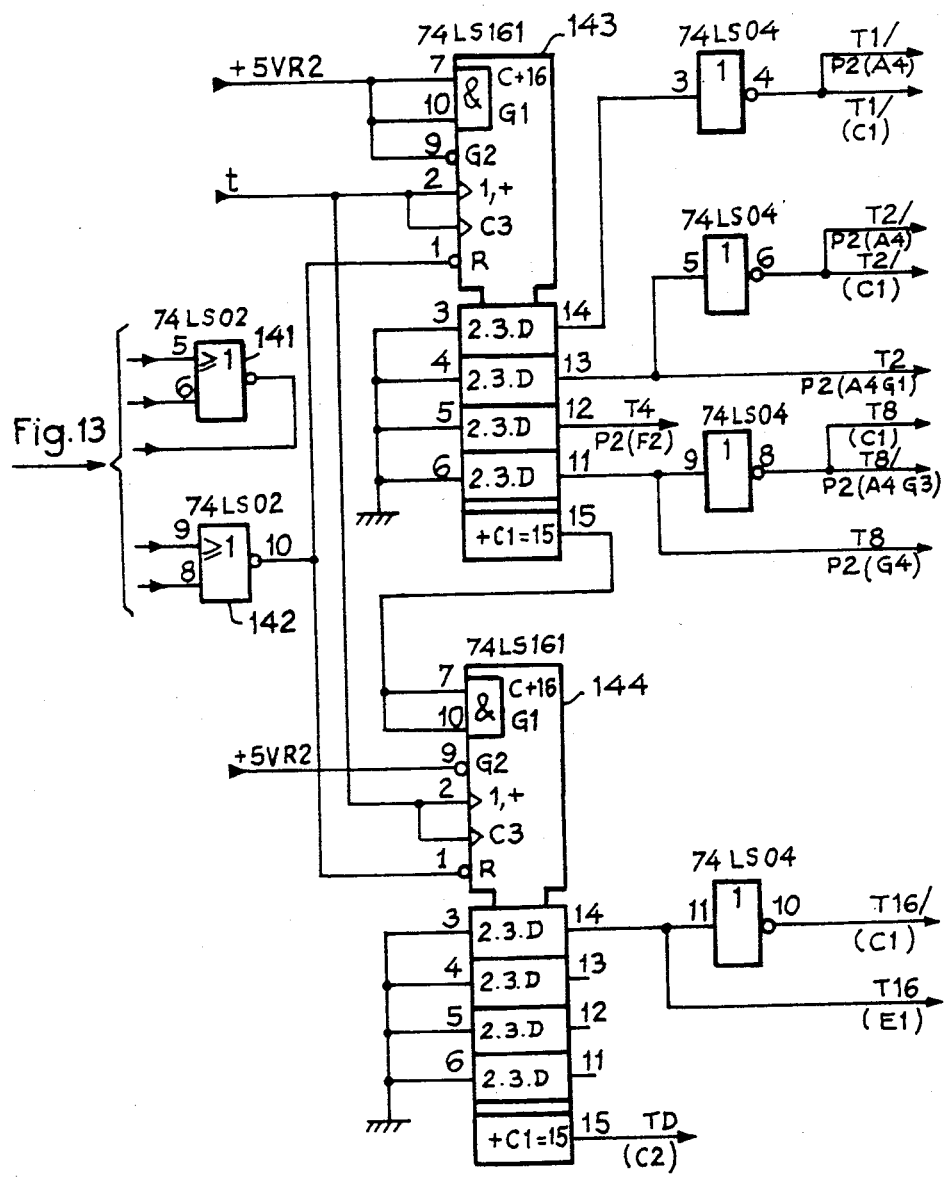

Call register 801 is formed from circuits 131 to 137, call register 802 is formed from circuits 138 to 237 and excluding logic 803 from circuits 238 and 239 in FIG. 13.

Sequencer 804 is formed from the circuits shown in FIG. 13, among which circuits 141 and 142 are used for initiation and circuits 143, 144 for counting the necessary times.

The input selection circuits 806 to 808 for the coupling and information signals are shown in FIG. 15. Integrated circuits 151 to 154 form circuit 806, integrated circuits 155 to 158 form circuit 807 and circuits 159, 251 to 253 form circuit 808. Integrated circuit 254 makes it possible to collect the signals at the output and to supply them synchronously with a time lag.

Address memory 811 and check memory 817 are shown in FIG. 16 in which register 164 permits storage to take place under the control of a reception clock formed by circuits 161 to 163.

FIG. 17 shows the diagram of the forward parity control circuit 816.

The circuit for the decoding and emission of the coupling signals at the output of the LSM is shown in FIG. 18 in which the integrated circuit 181 is the decoder decoding the information from integrated circuit 164 of FIG. 16 and integrated circuits 182 and 183 permit the transmission and blocking under the action of signals coming from the sequencer.

Figure 19:
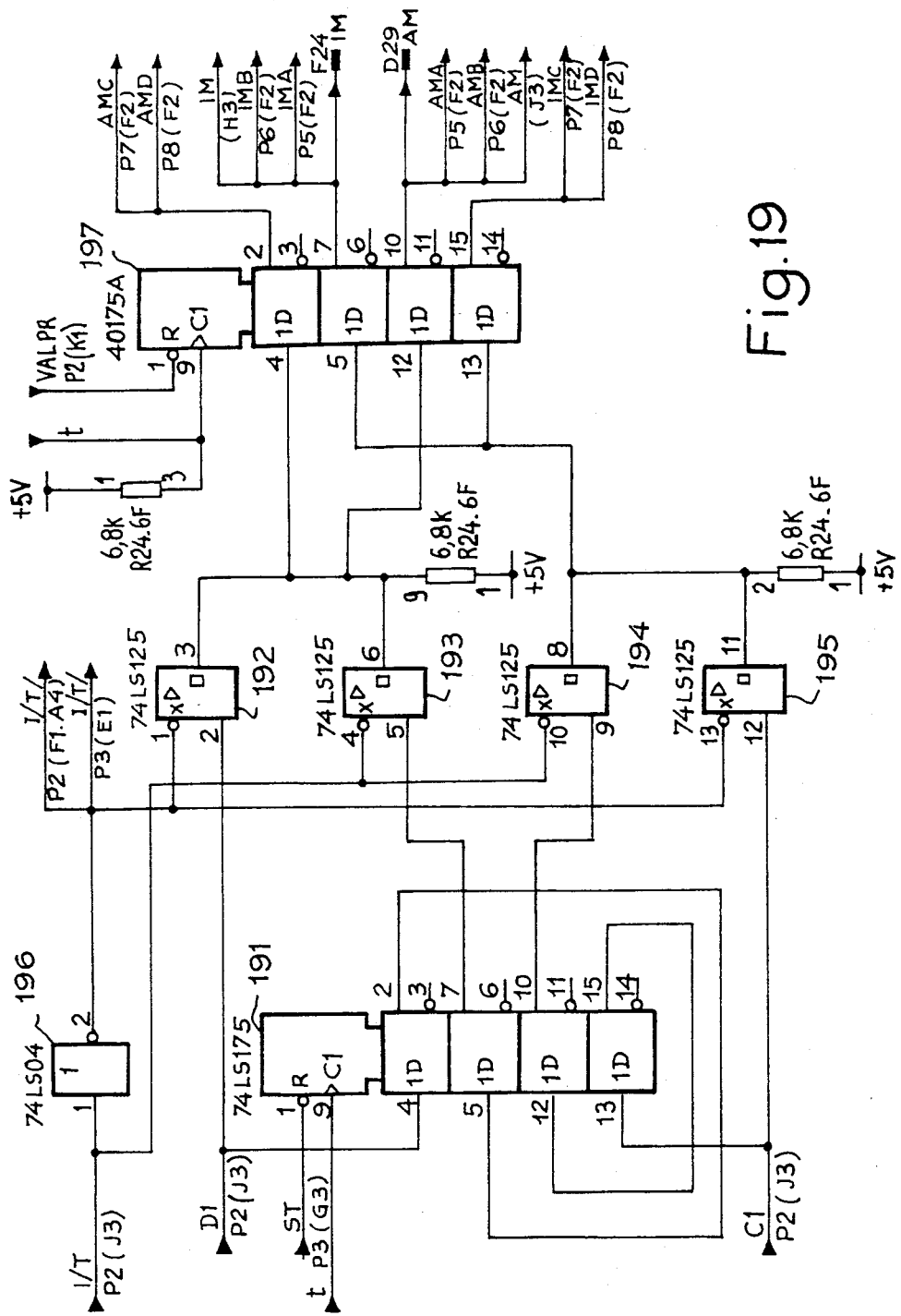

The circuit shown in FIG. 19 combines both the shift registers 814 and 819, the selection devices 813 and 818 and the output registers 815 and 820. For this purpose the information signals either pass via integrated circuits 192 and 194 or via integrated circuits 193 and 194 and in the latter case undergo a delay in integrated circuit 191. The control of the direct or delayed passage is brought about by means of bit IT, itself applied to the branching circuits, either directly or via circuit 196. Output register 197 groups the two registers 815 and 820.

In FIG. 20 the coupling fault checking circuit 809 is realized by integrated circuits 321 and 322. The fault management circuit 810 itself comprises integrated circuits 323 to 327.

Figure 21:
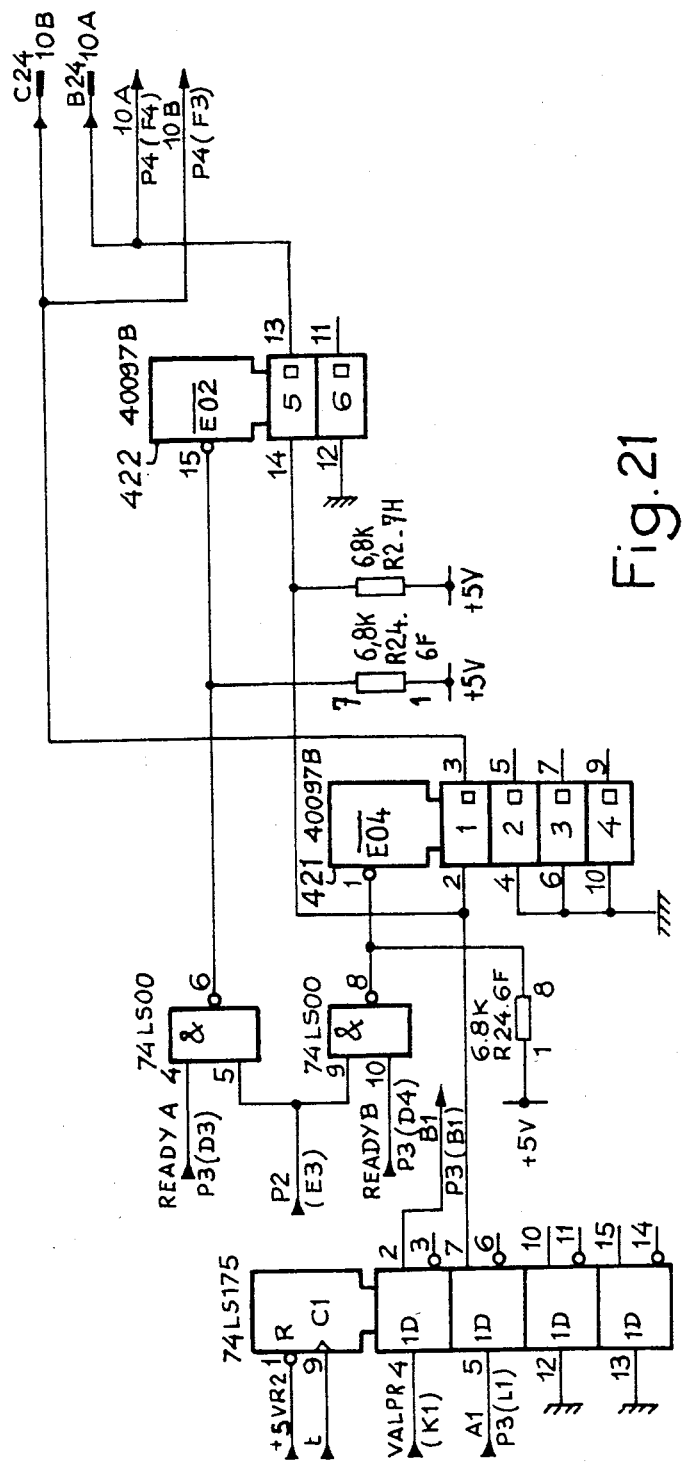

The diagram of the output register 824 for transmitting return signals to the central unit is shown in FIG. 21. Integrated circuits 421 and 422 make it possible to transmit the return message either to central unit A or to central unit B.

Figure 22:
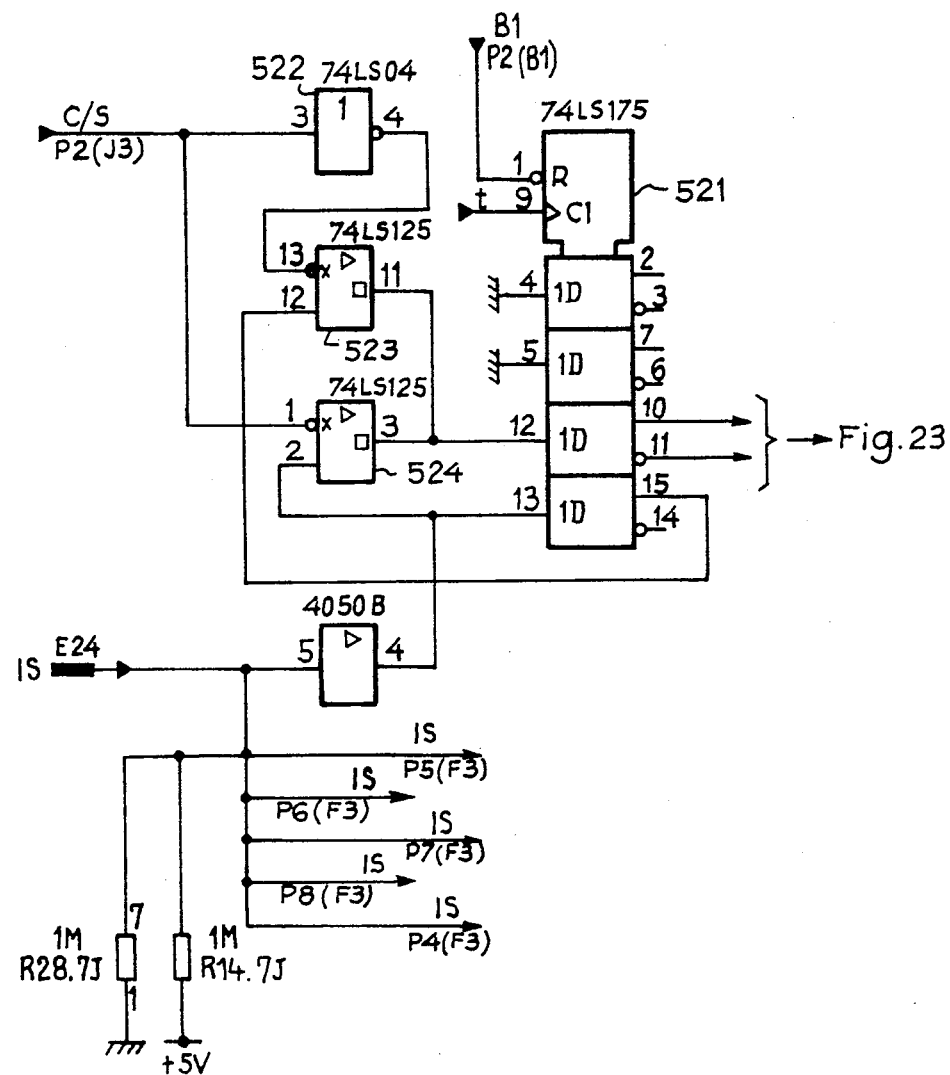

The diagram of the input register for the return signals from the STM is shown in FIG. 22, in which integrated circuit 521 forms the actual register, whilst integrated circuits 522 to 524 make it possible, by effecting a supplementary relooping via circuit 521, to add a time lag of a supplementary clock cycle to the return signal under the control of information bit CS in the case when the latter is used. This is always possible because it exists in the format and for some other application the central control unit could position it in such a way as to make it active.

Figure 23:
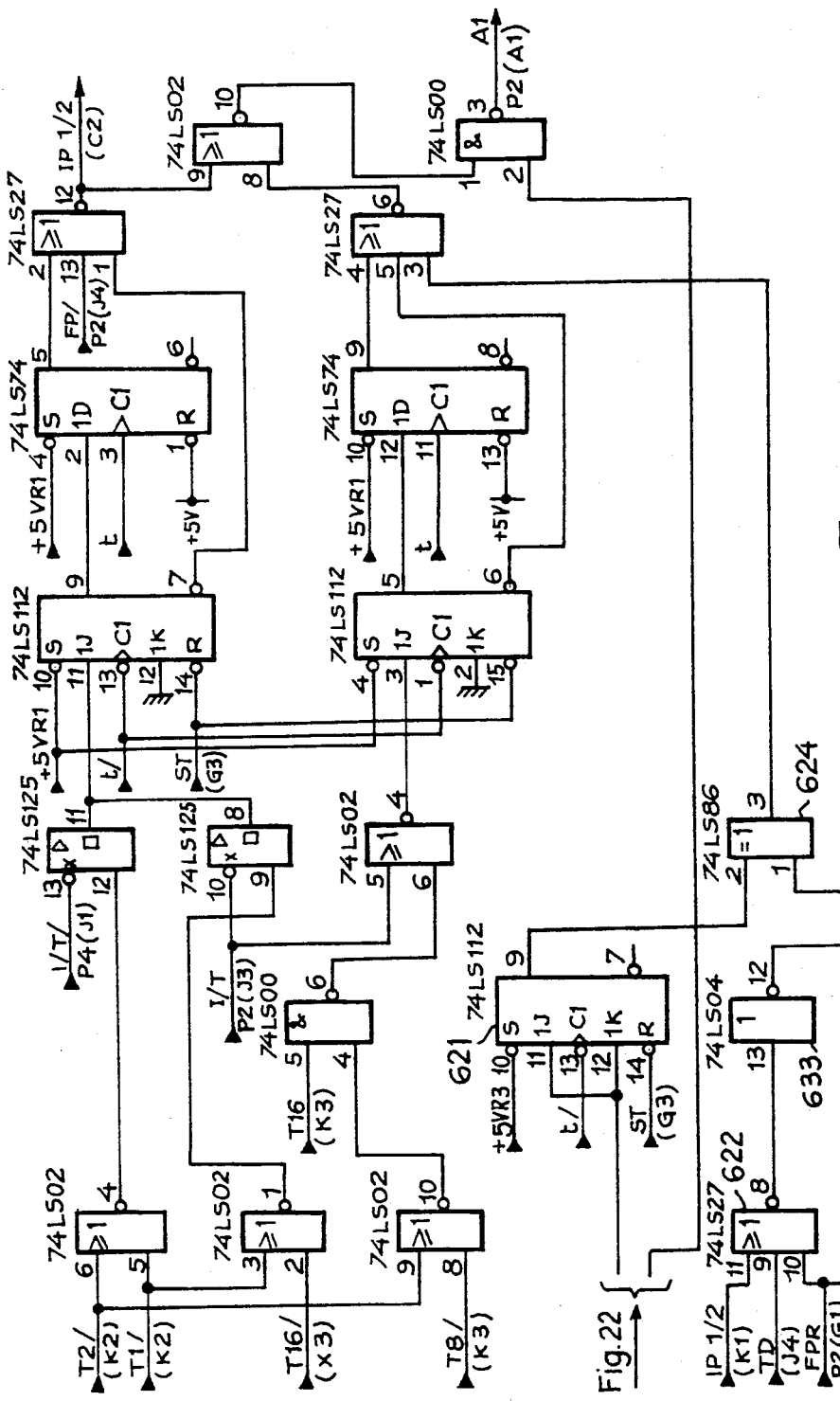

The backward parity generator 823 is formed by integrated circuits 621 to 624 in FIG. 23. The other integrated circuits of FIG. 23 are used for forming the summation circuit 822 in which are added both return signal IS and the backward parity information generated by circuit 823 as well as the forward parity control signal from circuit 816.

Conventional large-scale integration processes make it possible to integrate in per se known manner all the circuits described relative to FIGS. 13 to 23 on a single large-scale integrated circuit chip.

What is claimed is:

1. A logic selection module for transmitting outgoing signals from one upstream device out of two to one downstream device out of eight, comprising means for receiving a call signals from the upstream devices, detecting the first call and transmitting a ready signal to the first upstream calling device, means for receiving incoming coupling, address and data signals transmitted by the upstream devices and selecting under the control of the ready signal the signals transmitted by the first upstream calling device, means for decoding in the address signal the address of the downstream device to receive the signals to be transmitted, storing this address for the processing period of the logic selection module and transmitting to the thus selected downstream device an outgoing coupling signal, and means for blocking in the incoming address and data signal carrying both the information intended for the logic selection module and for the selected downstream device, and transmitting to the downstream device selected by the outgoing coupling signal, the information for use by the downstream device.

2. A module according to claim 1, wherein it also comprises means for receiving a return signal emitted by the downstream device in answer to information received from the module, and means for transmitting under the control of the ready signal, the return signal to whichever of the upstream devices has emitted the outgoing signals.

3. A module according to claim 2, wherein it also comprises means for supervising the duration of operation of the module on the basis of the reception of the call from one of the upstream devices and for switching the signal-receiving module of the other upstream device when the time exceeds a predetermined value.

4. A module according to claim 3, wherein it also comprises means for decoding in the header of the data signal received from the upstream device, a signal indicating to the module the nature of the upstream device to which it is connected, and means for bringing about a delay determined by the value of the thus coded signal to the address and data signals transmitted to the selected downstream device.

5. A module according to claim 4, wherein it also comprises means for supervising the coupling signal received from the upstream device and for interrupting the transmission of the outgoing, coupling address and data signals when the coupling signal received from the upstream device disappears.

6. A module according to claim 5, wherein it also comprises means for checking the parity of the signals received and for interrupting transmission in the case of a parity fault.

7. A module according to claim 6, wherein the return signal reception means comprise means for generating a backward parity signal and means for adding to the return signal said backward parity signal and the outgoing parity checking signal.

8. A module according to claim 1, wherein it is realized in the form of an integrated circuit with large-scale integration comprising twentyeight terminals consisting of two supply terminals, one clock input terminal, two call input terminals, two call validation input terminals, two ready output terminals, two coupling input terminals, two address input terminals, two data input terminals, eight coupling output terminals, one address output terminal, one data output terminal, one return information input terminal and two return information output terminals.

* * * * *